(12) United States Patent
Itoyama et al.

(10) Patent No.: US 6,247,311 B1
(45) Date of Patent: Jun. 19, 2001

(54) DIESEL ENGINE CONTROLLER

(75) Inventors: Hiroyuki Itoyama, Yokohama; Takashi Shirakawa; Manabu Miura, both of Yokosuka, all of (JP)

(73) Assignee: Nissan Motor Co., Ltd., Yokohama (JP)

( * ) Notice: Subject to any disclaimer, the term of this patent is extended or adjusted under 35 U.S.C. 154(b) by 0 days.

(21) Appl. No.: 09/506,259

(22) Filed: Feb. 17, 2000

(30) Foreign Application Priority Data

Feb. 23, 1999 (JP) .................................. 11-044754

(51) Int. Cl.⁷ .................................................. F02D 23/00
(52) U.S. Cl. ............................ 60/602; 60/605.2; 60/614
(58) Field of Search .................... 60/602, 605.1, 60/605.2, 614, 615, 600, 603

(56) References Cited

U.S. PATENT DOCUMENTS

| | | | |
|---|---|---|---|
| 4,235,076 | * 11/1980 | Meloche et al. | 60/602 |
| 5,996,347 | * 12/1999 | Nagae et al. | 60/602 |
| 6,067,798 | * 5/2000 | Okada et al. | 60/602 |
| 6,128,902 | * 10/2000 | Kolmanovsky et al. | 60/602 X |

FOREIGN PATENT DOCUMENTS 7-139413   5/1995 (JP) .

OTHER PUBLICATIONS

A J Truscott, "Simulation of a variable geometry turbocharged–diesel engine for control algorithm development," IMechE, pp. 69–77, (1997).
Susumu Kohketsu et al, "EGR System in a Turbocharged Diesel Engine," Japan Institute of Automobile Technology, pp. 193–196, (Oct. 1996).

* cited by examiner

Primary Examiner—Hoang Nguyen
(74) Attorney, Agent, or Firm—Foley & Lardner

(57) ABSTRACT

An exhaust passage (2) of a diesel engine (1) is connected to an intake passage (3) via an exhaust gas recirculation passage (4) provided with an exhaust gas recirculation valve (6). A turbine (52) of a variable capacity turbocharger (50) is provided in the exhaust passage (2). The controller (41) controls the opening of the exhaust gas recirculation valve (6), and the opening of a nozzle (53) of the turbine (52). A controller (41) first calculates a target exhaust gas recirculation valve opening surface area based on a target exhaust gas recirculation flowrate, and controls the exhaust gas recirculation valve opening to the target exhaust gas recirculation valve opening surface area.

11 Claims, 18 Drawing Sheets

DIESEL ENGINE CONTROLLER

FIELD OF THE INVENTION

This invention relates to control of a diesel engine equipped with a variable capacity turbocharger and an exhaust recirculation device.

BACKGROUND OF THE INVENTION

Tokkai Hei 7-139413 published by the Japanese Patent Office in 1995 discloses a control method of a diesel engine equipped with a turbocharger and an exhaust gas recirculation (EGR) device. The EGR device comprises an EGR valve which regulates an EGR flowrate. The control method determines a turbocharging region and an EGR region according to a load and rotation speed of the engine.

"Simulation of a variable geometry turbocharged-diesel engine for control algorithm development", C524/127/97 published by the United Kingdom Institution of Mechanical Engineers (IMechE) in 1997 discloses a control method for controlling the EGR valve and a variable nozzle of the turbocharger in a transient state of the diesel engine.

"EGR System in a Turbocharged Diesel Engine", pp. 193–196, Technical Preprints, published by the Japan Institute of Automobile Technology in October, 1996, discloses control of the EGR flowrate of the EGR device by varying the opening area of the variable nozzle of the turbocharger.

SUMMARY OF THE INVENTION

In some of the prior art techniques, when the EGR flowrate is varied, the supercharging pressure of the turbocharger is maintained constant, and when the variation of turbocharging pressure is performed, the EGR amount is maintained constant.

However, when the EGR flowrate is varied, the turbocharging pressure will vary, and when the turbocharging pressure is varied, the EGR flowrate will also vary because the exhaust pressure varies. That is, the turbocharging pressure and the EGR flowrate affect each other. Therefore, if it is attempted to keep the turbocharging pressure constant when varying the EGR flowrate the opening of the variable nozzle of the turbocharger must be readjusted. Moreover, if it is attempted to keep the EGR flowrate constant when the turbocharging pressure is varied, the opening of the EGR valve must be readjusted.

This control works effectively when the engine is operated in a steady state, but it does not work well in the transient state when running conditions of the engine vary. Further, if the opening of the variable nozzle and the opening of the EGR valve are changed simultaneously, the change in one of the turbocharging pressure and EGR flowrate may result in a disturbance in the control of the other.

In a diesel engine, the turbocharging pressure and the EGR flowrate affect the amount of noxious substances in the exhaust gas, so both the turbocharging pressure and the EGR flowrate must be controlled to optimum values in order to reduce the amount of noxious substances. However, it is difficult to control the EGR flowrate and the turbocharging pressure to optimum values for the above-mentioned reason, especially in the transient state of the engine.

It is therefore an object of this invention to actively vary a turbocharging pressure and EGR flowrate based on identical parameters, and control both the turbocharging pressure and EGR flowrate to optimum values.

In order to achieve the above object, this invention provides a control device for controlling an opening of an exhaust recirculation valve which is provided in an exhaust gas recirculation passage of an diesel engine and an opening of a turbine nozzle which is provided in a turbine of a turbocharger of the diesel engine. The diesel engine is provided with an intake passage and an exhaust passage which is connected by the exhaust gas recirculation passage. The turbine is disposed in the exhaust passage and drives a compressor disposed in the intake passage.

The control device comprises a sensor which detects an engine rotation speed, and a microprocessor. The microprocessor is programmed to calculate a target exhaust gas recirculation flowrate based on a target exhaust gas recirculation rate, calculate a target exhaust gas recirculation valve opening surface area based on the target exhaust gas recirculation flowrate, control the opening of the exhaust gas recirculation valve to the target exhaust gas recirculation valve opening surface area, calculate a target turbocharging pressure, calculate an exhaust system total opening surface area from the target turbocharging pressure and the engine rotation speed, calculate an opening surface area of the turbine nozzle when the same flowrate of exhaust gas as the target exhaust gas recirculation flowrate flows through the turbine, as an exhaust gas recirculation valve opening surface area equivalent value, calculate a nozzle opening surface area equivalent value by deducting the exhaust gas recirculation valve opening surface area equivalent value from the exhaust system total opening surface area, calculate a target nozzle opening surface area based on the nozzle opening surface area equivalent value, and control the opening of the turbine nozzle to the target nozzle opening surface area.

This invention also provides a control method for controlling an opening of an exhaust recirculation valve which is provided in an exhaust gas recirculation passage of an diesel engine and an opening of a turbine nozzle which is provided in a turbine of a turbocharger of the diesel engine. The diesel engine is provided with an intake passage and an exhaust passage which are connected by the exhaust gas recirculation passage. The turbine is disposed in the exhaust passage and drives a compressor disposed in the intake passage. The control method comprises detecting an engine rotation speed, calculating a target exhaust gas recirculation flowrate based on a target exhaust gas recirculation rate, calculating a target exhaust gas recirculation valve opening surface area based on the target exhaust gas recirculation flowrate, controlling the opening of the exhaust gas recirculation valve to the target exhaust gas recirculation valve opening surface area, calculating a target turbocharging pressure, calculating an exhaust system total opening surface area from the target turbocharging pressure and the engine rotation speed, calculating an opening surface area of the turbine nozzle when the same flowrate of exhaust gas as the target exhaust gas recirculation flowrate flows through the turbine, as an exhaust gas recirculation valve opening surface area equivalent value, calculating a nozzle opening surface area equivalent value by deducting the exhaust gas recirculation valve opening surface area equivalent value from the exhaust system total opening surface area, calculating a target nozzle opening surface area based on the nozzle opening surface area equivalent value, and controlling the opening of the turbine nozzle to the target nozzle opening surface area.

The details as well as other features and advantages of this invention are set forth in the remainder of the specification and are shown in the accompanying drawings.

DESCRIPTION OF THE PREFERRED EMBODIMENTS

Figure 1:
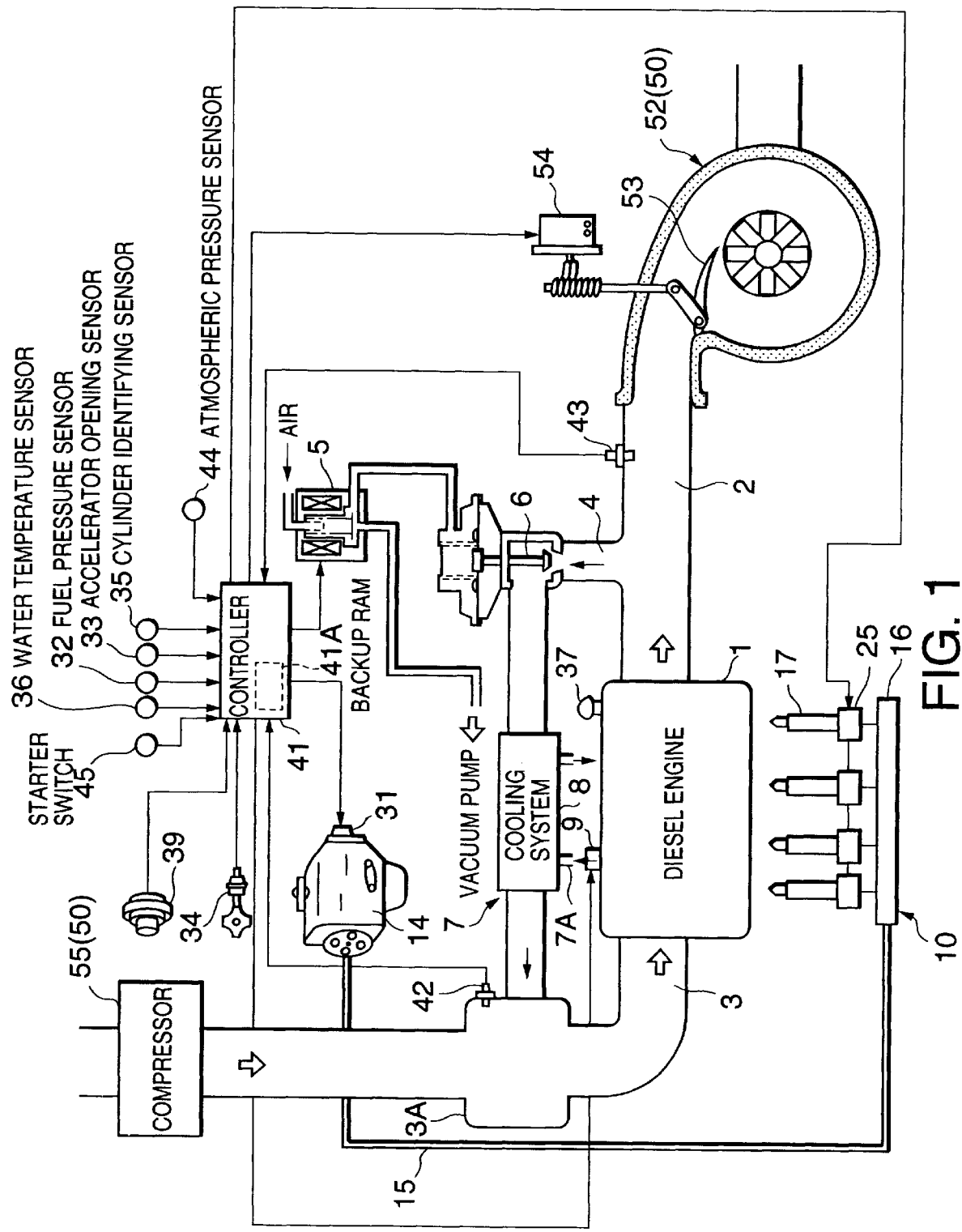
FIG. 1 is a schematic diagram of a control device for a diesel engine according to this invention.

Referring to FIG. 1 of the drawings, a diesel engine 1 comprises an intake passage 3 and exhaust passage 3. The diesel engine 1 is a multi cylinder diesel engine so constructed that the pattern of heat release is single stage combustion due to performing low temperature premix combustion. Such a diesel engine is disclosed by Tokkai Hei 7-4287 published by the Japanese Patent Office in 1995. Intake air of the intake air passage 3 is supplied to each cylinder of the diesel engine 1 via a collector 3A.

A swirl control valve is provided in an intake port leading from the intake passage 3 to each cylinder. When the diesel engine 1 is running at low rotation speed on low load, the swirl control valve closes part of the passage and sets up a swirl in the flow of air flowing into the combustion chamber of the diesel engine 1.

The combustion chamber comprises a large diameter toroidal combustion chamber. This is a combustion chamber wherein a cylindrical cavity of the same diameter is formed on a piston from a cap surface to a base. A conical part is formed at the base of the cavity. As a result, resistance to the swirl flowing in from the outside of the cavity is reduced, and mixing of air and fuel is promoted. Also, due to the shape of the cavity, the swirl diffuses from the center of the cavity to the outside as the piston descends.

The diesel engine 1 comprises a common rail type fuel injection mechanism 10.

Figure 2:
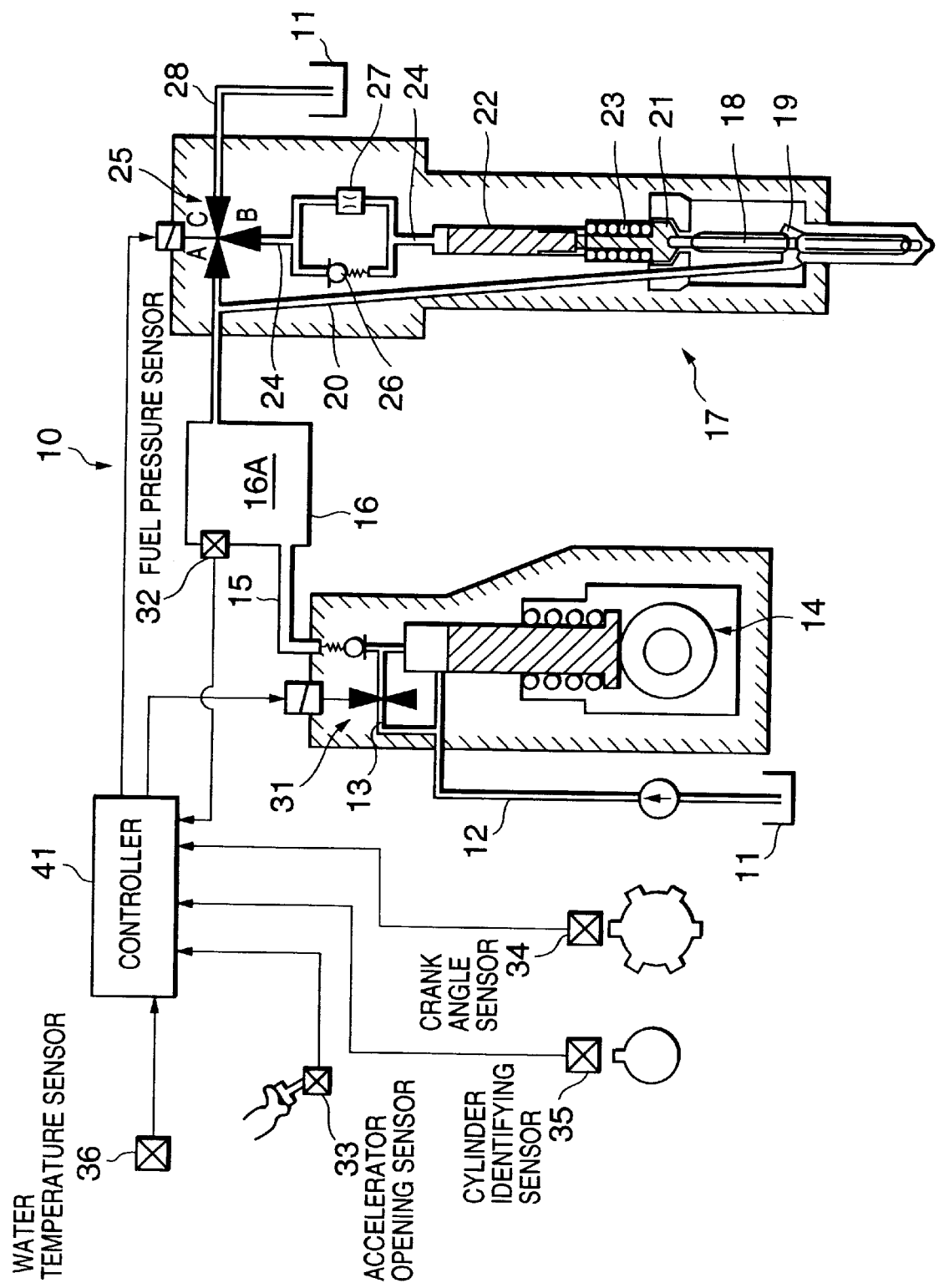
FIG. 2 is a schematic diagram of a common rail fuel injection mechanism with which the diesel engine is provided.

Referring to FIG. 2, a fuel injection mechanism 10 comprises a fuel tank 11, fuel supply passage 12, supply pump 14, pressure accumulating chamber 16A formed in a common rail 16, and a nozzle 17 which is provided for every cylinder. After the fuel supplied from the supply pump 14 is stored in a pressure accumulator 16A via a high pressure fuel passage 15, it is distributed to each of the nozzles 17.

The nozzle 17 comprises a needle valve 18, nozzle chamber 19, fuel passage 20 to the nozzle chamber 19, retainer 21, hydraulic piston 22, return spring 23, fuel passage 24 which leads high pressure fuel to the hydraulic piston 22, and three-way solenoid valve 25 interposed in the fuel passage 24. A check valve 26 and an orifice 27 are also provided in parallel in the fuel passage 24. The return spring 23 pushes the needle valve 18 in the closing direction of the lower part of the figure via the retainer 21. The hydraulic piston 22 comes in contact with the upper edge of the retainer 21.

The three-way valve 25 comprises a port A connected to the pressure accumulating chamber 16A, port B connected to the fuel passage 24 and port C connected to a drain 28. When the three-way valve 25 is OFF, ports A and B are connected and ports B and C are shut off. As a result, the fuel passages 20 and 24 are connected, and high pressure fuel is led to both the upper part of the hydraulic piston 22 and the nozzle chamber 19 from the pressure accumulating chamber 16A. As the pressure-receiving surface area of the hydraulic piston 22 is larger than the pressure-receiving surface area of the needle valve 18, in this state, the needle valve 18 sits in the valve seat, and the nozzle 17 is thereby closed.

In the state where the three-way valve 25 is ON, the ports A and B are shut off, and the ports B and C are connected. Consequently, the fuel pressure of the fuel passage 24 which pushes the hydraulic piston 22 downward is released to the fuel tank 11 via the drain 28, the needle valve 18 lifts due to the fuel pressure of the nozzle chamber 19 which acts on the needle valve 18 in an upward direction, and the fuel of the nozzle chamber 19 is injected from the hole at the end of the nozzle 17. If the three-way valve 25 is returned to the OFF state, the fuel pressure of the pressure accumulating chamber 16A again acts downward on the hydraulic piston 22, the needle valve 18 sits in the valve seat, and fuel injection is terminated.

That is, fuel injection start timing is adjusted by the change-over timing from OFF to ON of the three-way valve 25, and fuel injection amount is adjusted by the duration of the ON state. Therefore, if the pressure of the pressure accumulating chamber 16A is the same, the fuel injection amount increases the longer the ON time of the three-way valve 25.

Further, to adjust the pressure of the pressure accumulating chamber 16A, the fuel injection mechanism 10 comprises a return passage 13 which returns the surplus fuel discharged by the supply pump 14 to the fuel supply passage 12. The return passage 13 is provided with a pressure regulating valve 31. The pressure regulating valve 31 opens and closes the return passage 13, and adjusts the pressure of the pressure accumulating chamber 16A by varying the fuel supply amount to the pressure accumulating chamber 16A.

The fuel pressure of the pressure accumulating chamber 16A is equal to the fuel injection pressure of the nozzle 17, and the fuel injection rate is higher the higher the fuel pressure of the pressure accumulating chamber 16. The three-way valve 25 and the pressure regulating valve 31 function according to the input signal from the controller 41.

The above construction of the fuel injection mechanism 10 is disclosed and known from pp. 73–77, Lecture Papers of the 13th Symposium on the Internal Combustion Engine.

Now, referring again to FIG. 1, after the exhaust gas in the exhaust passage 2 drives an exhaust gas turbine 52 of a variable capacity turbocharger 50, it is discharged into the atmosphere. The variable capacity turbocharger 50 comprises the exhaust gas turbine 52 and a compressor 55 which compresses air by the rotation of the exhaust gas turbine 52. The compressor 55 is provided in the middle of the intake passage 3, and the intake passage 3 supplies air compressed by the compressor 55 to the diesel engine 1. A variable nozzle 53 joined to a step motor 54 is provided at an inlet to the exhaust gas turbine 52. The step motor 54 varies the nozzle opening of the variable nozzle 53 according to an input signal from the controller 41. As a result, when the rotation speed of the diesel engine 1 is low, the nozzle opening is reduced and the flow velocity of exhaust gas introduced to the exhaust gas turbine 52 is increased so that a predetermined supercharging pressure is attained. On the other hand, when the rotation speed of the diesel engine 1 is high, the nozzle opening is fully opened in order to introduce exhaust gas into the exhaust gas turbine 52 without resistance. Further, under predetermined conditions, the nozzle opening is varied in order to lower the turbocharging pressure.

When the air-fuel mixture is burnt in the diesel engine 1, noxious nitrogen oxides (NOx) are formed. The NOx amount largely depends on the combustion temperature, and the generation amount of NOx can be suppressed by making the combustion temperature low. This diesel engine 1 reduces the oxygen concentration in the combustion chamber by exhaust recirculation (EGR), and thereby realizes low-temperature combustion. For this purpose, the diesel engine 1 comprises an exhaust gas recirculation (EGR) passage 4 which connects the exhaust passage 2 upstream of the exhaust gas turbine 52 and a collector 3A of the intake passage 3 The EGR passage 4 is provided with a diaphragm type exhaust gas recirculation (EGR) valve 6 which responds to a control negative pressure provided from a negative pressure control valve 5 and a cooling system 7.

The negative pressure control valve 5 generates a negative pressure in response to a duty signal input from the controller 41, and thereby varies the rate of exhaust gas recirculation (EGR rate) via the EGR valve 6.

For example, in the low rotation speed, low load range of the diesel engine 1, the EGR rate is a maximum 100 percent, and as the rotation speed and load of the diesel engine 1 increase, the EGR rate is decreased. On high load, since the exhaust gas temperature is high, intake air temperature will rise if a large amount of EGR is performed. If the intake air temperature rises, NOx will no longer decrease, the ignition delay of injected fuel becomes shorter, and it becomes impossible to achieve premix combustion. Therefore, the EGR rate is made to decrease in stages as the rotation speed and load of the diesel engine 1 increase.

The cooling system 7 leads part of the engine cooling water to a water jacket 8 surrounding the EGR passage 4, and cools the recirculated exhaust gas in the EGR passage 4. A cooling water inlet 7A of the water jacket 8 is provided with a flow control valve 9 which adjusts the recirculating amount of cooling water according to a signal from the controller 41.

A pressure regulating valve 31, the three-way valve 25, the negative pressure control valve 5, a step motor 54 and the flow control valve 9 are respectively controlled by signals from the controller 41. The controller 41 comprises a microcomputer equipped with a central processing unit (CPU), random access memory (RAM), read-only memory (ROM) and input/output interface (I/O interface).

Signals corresponding to detection values are input to the controller 41 from a pressure sensor 32 which detects a fuel pressure of the pressure accumulating chamber 16A, an accelerator opening sensor 33 which detects an opening of a vehicle accelerator pedal, a crank angle sensor 34 which detects a rotation speed and crank angle of the diesel engine 1, a cylinder identifying sensor 35 which identifies cylinders of the diesel engine 1, a water temperature sensor 36 which detects a cooling water temperature of the diesel engine 1, an air flow meter 39 which detects an intake air flowrate of the intake passage 3 upstream of the compressor 55, an intake pressure sensor 42 which detects a pressure rPm of the turbocharged intake passage 3, an exhaust pressure sensor 43 which detects a pressure of the exhaust passage 2 upstream of the exhaust gas turbine 52, an atmospheric pressure sensor 44 which detects atmospheric pressure, and a starter switch 45 which starts the diesel engine 1 via a cell motor.

Based on the rotation speed of the diesel engine 1 and accelerator opening, the controller 41 calculates a target fuel injection amount of the nozzle 17 and target pressure of the pressure accumulating chamber 16A. The fuel pressure of the pressure accumulating chamber 16A is feedback controlled by opening and closing the pressure regulating valve 31 so that the actual pressure of the pressure accumulating chamber 16A detected by the pressure sensor 32 coincides with the target pressure.

The controller 41 also controls an ON time of the three-way valve 25 according to the calculated target fuel injection amount, and a fuel injection start timing in response to the running conditions of the diesel engine 1 by the change-over timing to ON of the three-way valve 25. For example, when the diesel engine 1 is in a low rotation speed, low load state under a high EGR rate, the fuel injection start timing is delayed near top dead center (TDC) of the piston so that the ignition delay of injected fuel is long. Due to this delay, the combustion chamber temperature at the time of ignition is lowered, and the generation of smoke due to the high EGR rate is suppressed by increasing the premix combustion ratio. On the other hand, the injection start timing is advanced as the rotation speed and load of the diesel engine 1 increase. This is due to the following reason. Specifically, even if the ignition delay period is constant, the ignition delay crank angle obtained by converting the ignition delay period increases in proportion to the increase in engine speed. Therefore, in order to fire the injected fuel at a predetermined crank angle, the injection start timing needs to be advanced at high rotation speed.

The controller 41 also controls the turbocharging pressure and EGR flowrate. This control is described below.

If the EGR flowrate is varied, as already stated, the turbocharging pressure will also vary. Conversely if the turbocharging pressure is varied, as the exhaust gas pressure varies, the EGR flowrate varies. Therefore, the turbocharging pressure and EGR flowrate cannot be controlled independently, and may cause an external control disturbance to each other.

If it is attempted to keep the turbocharging pressure constant when changing the EGR flowrate, the opening of the variable nozzle 53 of the turbocharger 50 must be readjusted. Also, if it is attempted to keep the EGR flowrate constant when changing the turbocharging pressure, the opening of the EGR valve 6 must be readjusted. In this method, it is difficult to ensure control precision during a transient state of the engine 1. According to this invention, the controller 41 treats the opening surface area of the EGR valve 6 and the opening surface area of the adjustable nozzle 53 as parameters of identical dimensions.

Next, the control of turbocharging pressure and EGR flowrate performed by the controller 41 will be described with reference to plural flowcharts and diagrams shown in FIGS. 3–19.

Among these figures, FIGS. 3, 4, and FIGS. 7–14 belong to a prior art Tokkai Hei 10-325350 published by the Japanese Patent Office in 1998.

Figure 3:
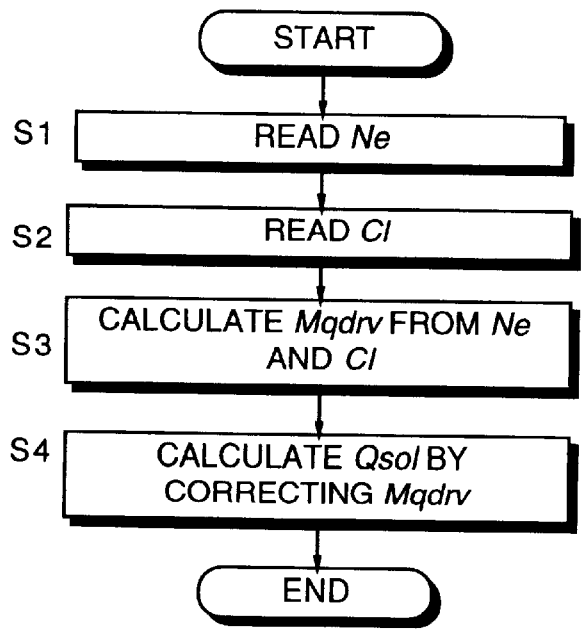
FIG. 3 is a flowchart describing a routine for calculating a target fuel injection amount performed by a controller according to this invention.

FIG. 3 shows a routine which calculates a target fuel injection amount Qsol. This routine is performed in synchronism with a REF signal output by the crank angle sensor 34 at every reference position in the combustion cycle of each cylinder.

In the case of a four stroke cycle engine, the REF signal is output every 180 degrees for a four-cylinder engine and every 120 degrees for a six-cylinder engine.

Figure 4:
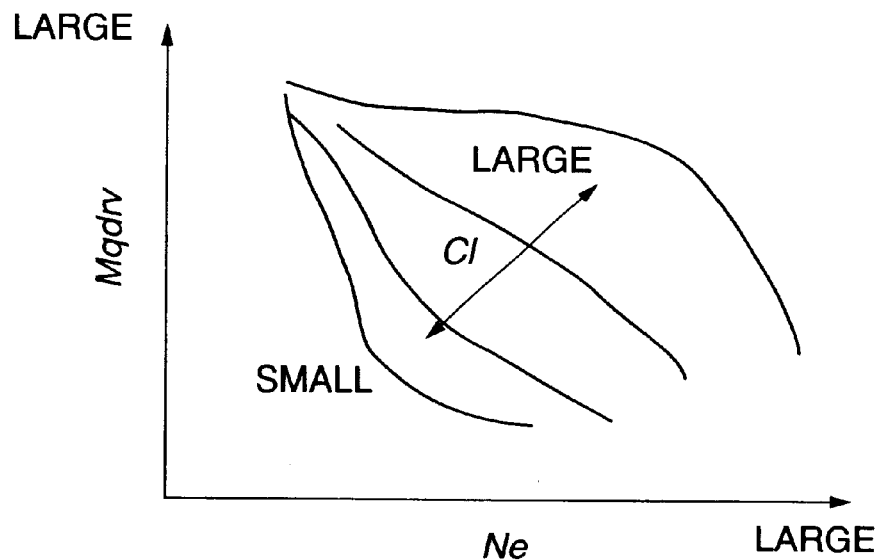
FIG. 4 is a diagram describing the contents of a basic fuel injection amount map stored by the controller.

In a step S1, the engine rotation speed Ne is read, and in a step S2, an accelerator opening Cl is read. In a step S3, the map shown in FIG. 4 is looked up based on the engine rotation speed Ne and accelerator opening Cl, and a basic fuel injection amount Mqdrv is calculated. This map is stored beforehand in the memory of the controller 41.

In a step S4, the target fuel injection amount Qsol is calculated by adding an increase correction compensation due to the engine cooling water temperature, etc., to the basic fuel injection amount Mqdrv.

Figure 5:
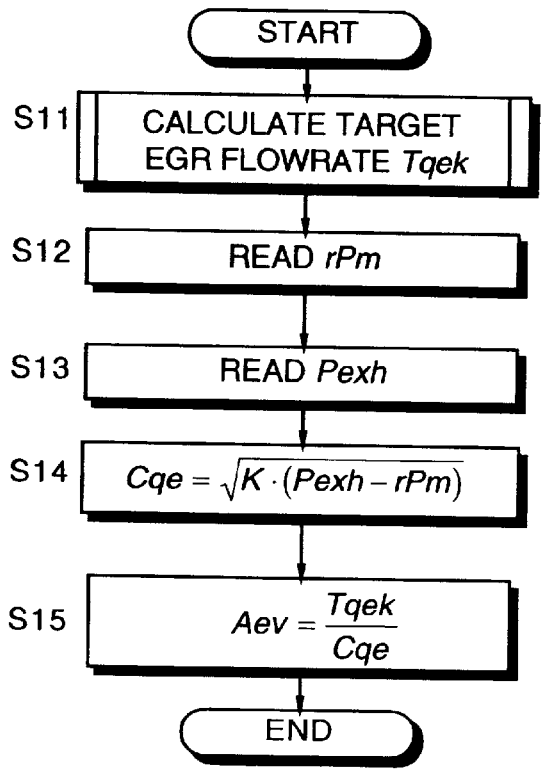
FIG. 5 is a flowchart describing a routine for calculating an EGR valve opening surface area performed by the controller.

FIG. 5 shows a routine which calculates a target opening surface area Aev of the EGR valve 6. This routine is also performed for every input of the REF signal.

First, a target EGR flowrate Tqek is calculated in a step S11.

Figure 7:
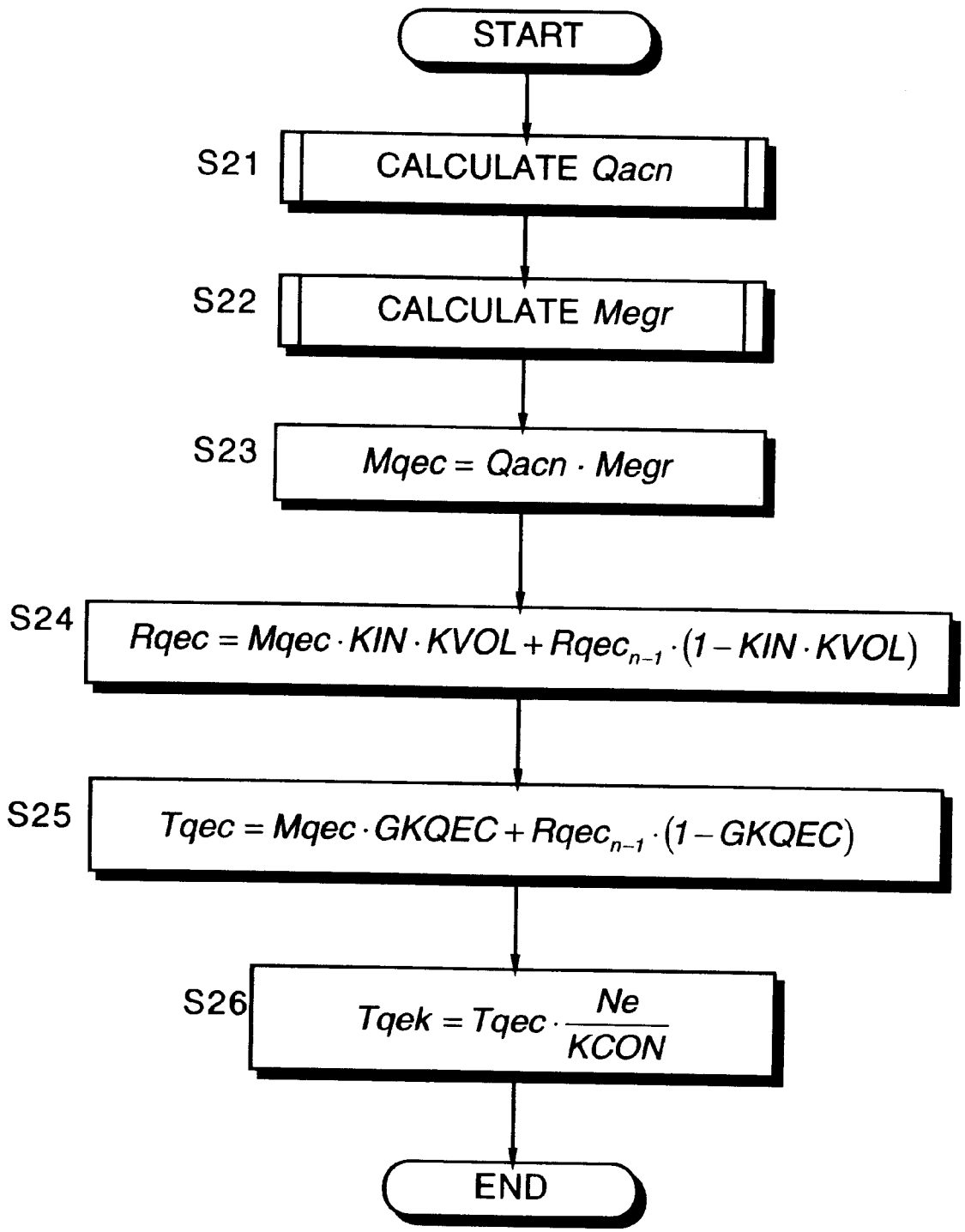
FIG. 7 is a flowchart describing a routine for calculating a target EGR flowrate performed by the controller.

This calculation is performed using the subroutine shown in FIG. 7. This subroutine will be described later.

In a step S12, the intake pressure rPm downstream of the compressor 55 detected by the intake pressure sensor 42 is read. In a step S13, an exhaust pressure Pexh upstream of the exhaust gas turbine 52 detected by the exhaust pressure sensor 43 is read. In a step S14, a flow velocity equivalent value Cqe is calculated by the following equation (1).

$$Cqe = \sqrt{K \cdot (Pexh - rPm)} \quad (1)$$

where, K=constant.

In a step S15, the target EGR valve opening surface area Aev is calculated by the following equation (2) from this flow velocity equivalent value Cqe and target EGR flowrate Tqek.

$$Aev = \frac{Tqek}{Cqe} \quad (2)$$

Figure 6:
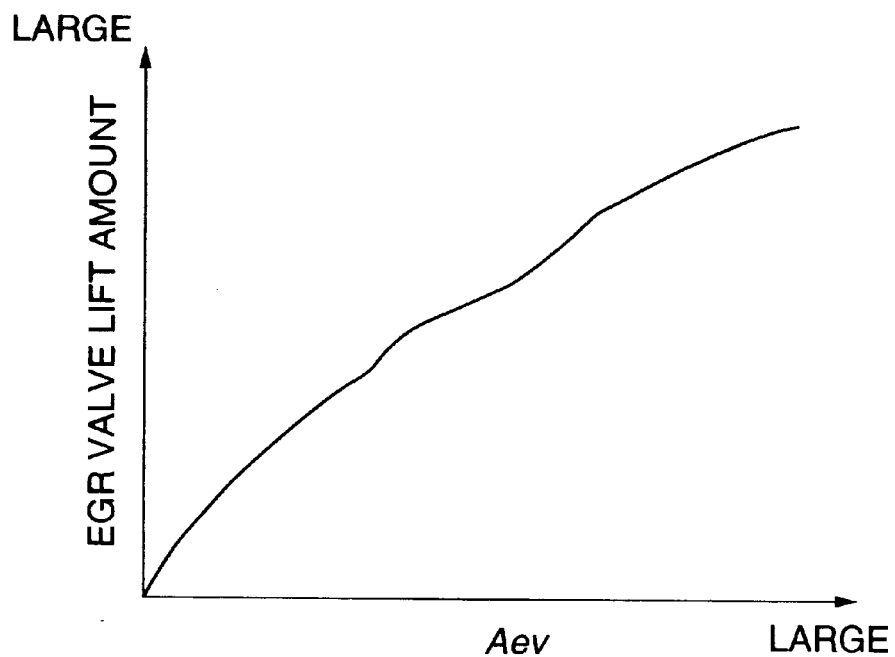
FIG. 6 is a diagram describing the contents of an EGR valve lift amount map stored by the controller.

The target EGR valve opening surface area Aev obtained is converted into a lift amount of the EGR valve 6 using the map shown in FIG. 6. This map is also stored beforehand in the memory of the controller 41. The controller 41 outputs a duty control signal to the negative pressure control valve 5 so that this lift amount may be obtained.

Although the intake pressure rPm and exhaust pressure Pexh are detected by pressure sensors, it is also possible to calculate them from the running conditions of the diesel engine 1.

Next, a subroutine for calculating the target EGR flowrate Tqek performed in the step S11 will be described referring to FIG. 7.

This subroutine is also performed for every input of the REF signal.

Figure 8:
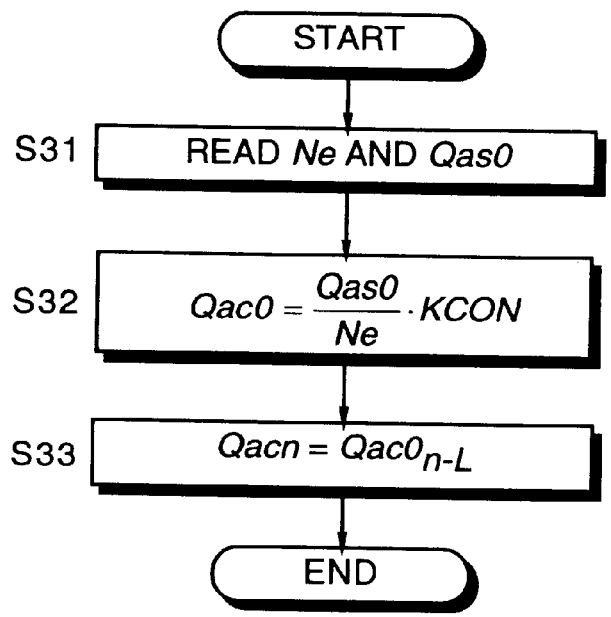
FIG. 8 is a flowchart describing a routine for calculating a cylinder intake air volume performed by the controller.

In a step S21, an intake air volume Qacn per cylinder is calculated using the subroutine shown in FIG. 8. This subroutine is also performed for every input of the REF signal.

Describing this subroutine, firstly, the engine rotation speed Ne and an intake air flowrate Qas0 of the intake passage 3 detected by the air flow meter 39 are read in a step S31.

In a step S32, the intake air volume Qac0 per cylinder is calculated by the following equation (3).

$$Qac0 = \frac{Qas0}{Ne} \cdot KCON \quad (3)$$

where, $KCON$ = constant.

The constant KCON is a constant for converting the intake air flowrate Qas0 of the intake passage 3 into an intake air amount per cylinder.

The unit of the intake air flowrate Qas0 is liter/sec while the unit of the engine rotation speed Ne is revolutions per minute (rpm). In a four-cylinder engine, two cylinders aspirate air in each revolution, whereas in a six-cylinder engine, three cylinders aspirate air in each revolution. Performing a minute-second conversion, therefore, the constant KCON is 30 for a four-cylinder engine and 20 for a six-cylinder engine.

In a step S33, the value of Qac0 when the subroutine was performed L times ago, i.e., $Qac0_{n-L}$, is set equal to the cylinder intake air volume Qacn. As the air flow meter 39 is provided upstream of the compressor 55, a time delay is produced between the time when the air flow meter 39 measures the intake air flow Qas0, and the time when this air is actually aspirated by the cylinder. In order to correct for this delay, the value of Qac0 L times ago is set to the cylinder intake air volume Qacn. The value of L is defined experimentally.

Figure 9:
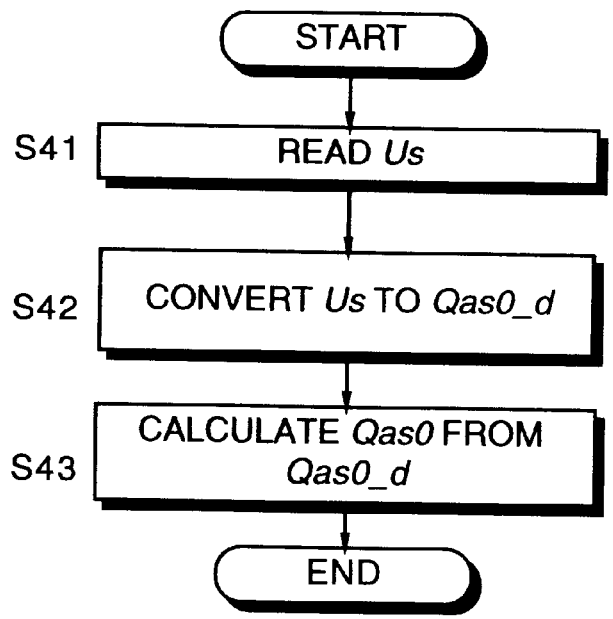
FIG. 9 is a flowchart describing a routine for detecting an intake air volume performed by the controller.
Figure 10:
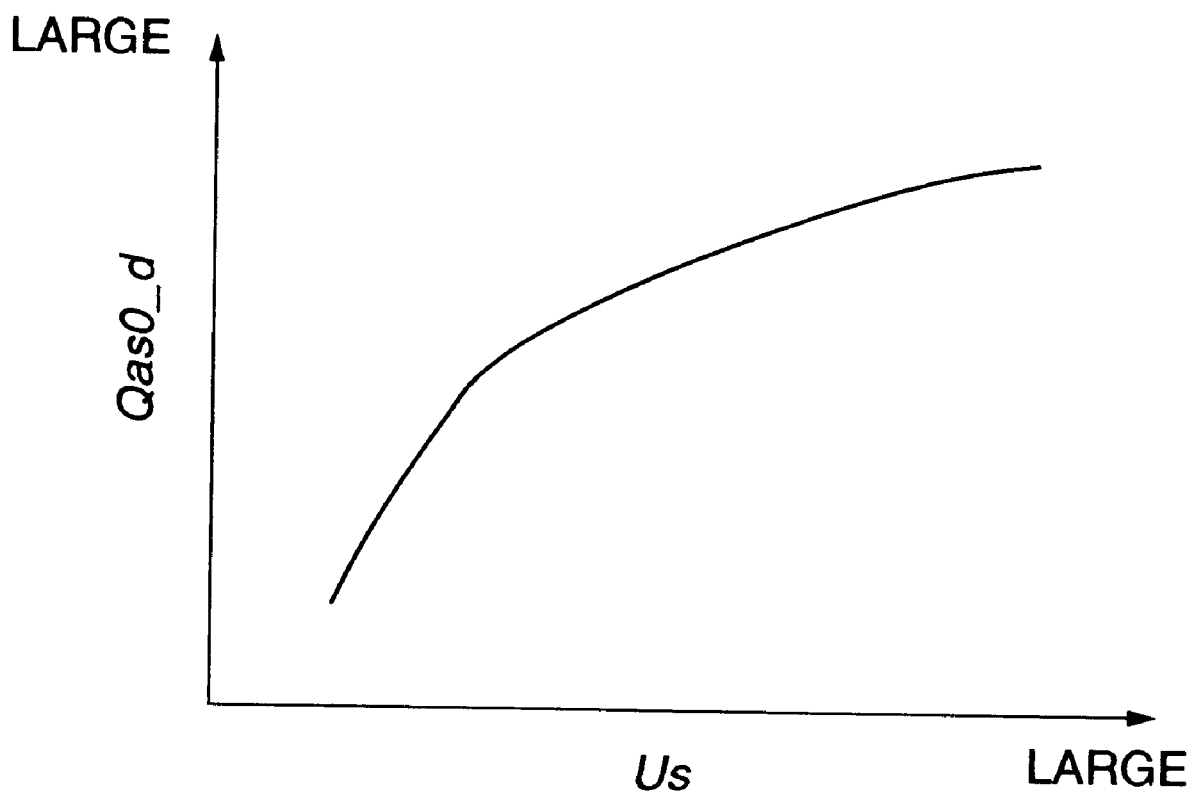
FIG. 10 is a diagram describing the contents of an intake air volume map stored by the controller.

The signal input into the controller 41 from the air flow meter 39 is an analog voltage signal Us, and the controller 41 converts the analog voltage signal Us into the intake air flowrate Qas0 of the intake passage 3 by the subroutine shown in FIG. 9. In this subroutine, the analog voltage signal Us is read in a step S41, and this is converted to a flowrate Qas0_d referring to a map shown in FIG. 10 in a step S42. This map is stored beforehand in the memory of the controller 41.

In a step S43, weighted average processing is applied to the flowrate Qas0_d, and the obtained value is set equal to the intake air flowrate Qas0 of the intake passage 3. This subroutine is performed every 4 milliseconds, for example.

Figure 11:
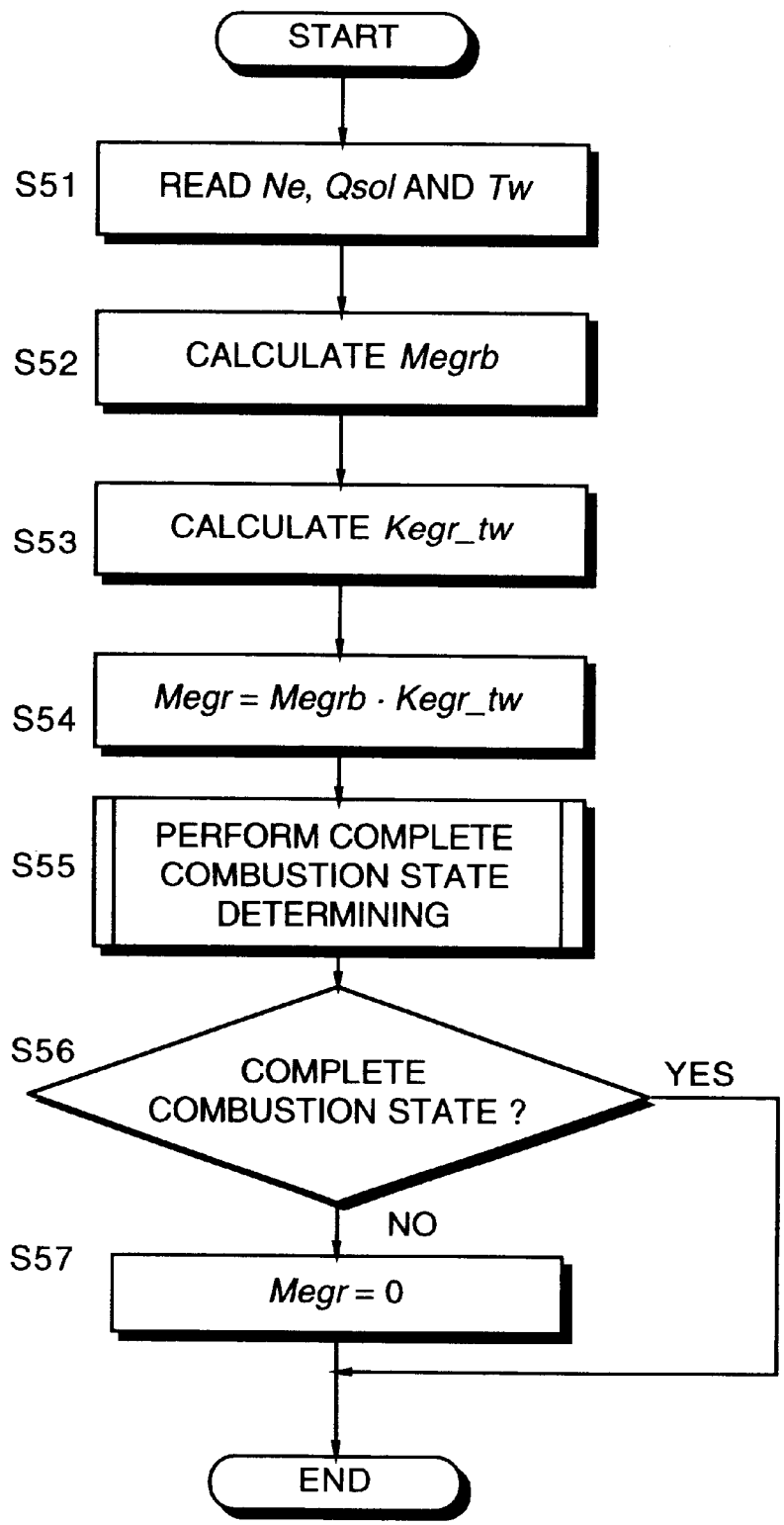
FIG. 11 is a flowchart describing a routine for calculating a target EGR rate performed by the controller.

Referring again to FIG. 7, in a following step S22, a target EGR rate Megr is calculated using the subroutine shown in FIG. 11. This subroutine is also performed for every input of the REF signal.

Describing this subroutine, the engine rotation speed Ne, target fuel injection amount Qsol and engine cooling water temperature Tw are first read in a step S51.

Figure 12:
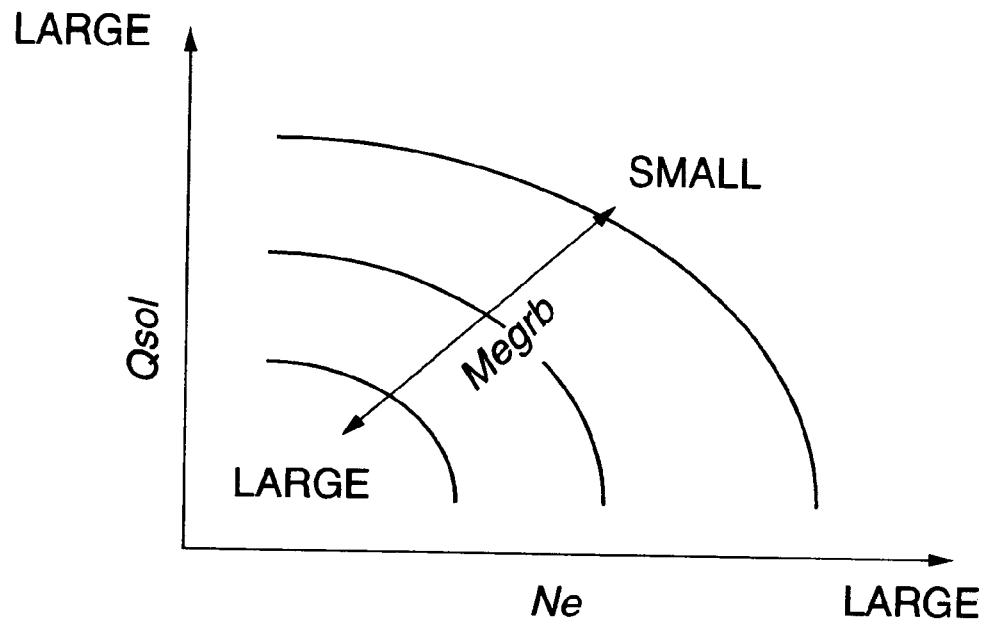
FIG. 12 is a diagram describing the contents of a basic target EGR rate map stored by the controller.

In the step S52, a basic target EGR rate Megrb is calculated from the engine rotation speed Ne and target fuel injection amount Qsol referring to a map shown in FIG. 12. This map is stored beforehand in the memory of the controller 41.

In this map, the basic target EGR rate Megrb is set larger the lower the rotation speed and the lower the load, i.e., the lower the injection amount. Conversely, it is set to be small for high engine output at which smoke tends to be generated.

Figure 13:
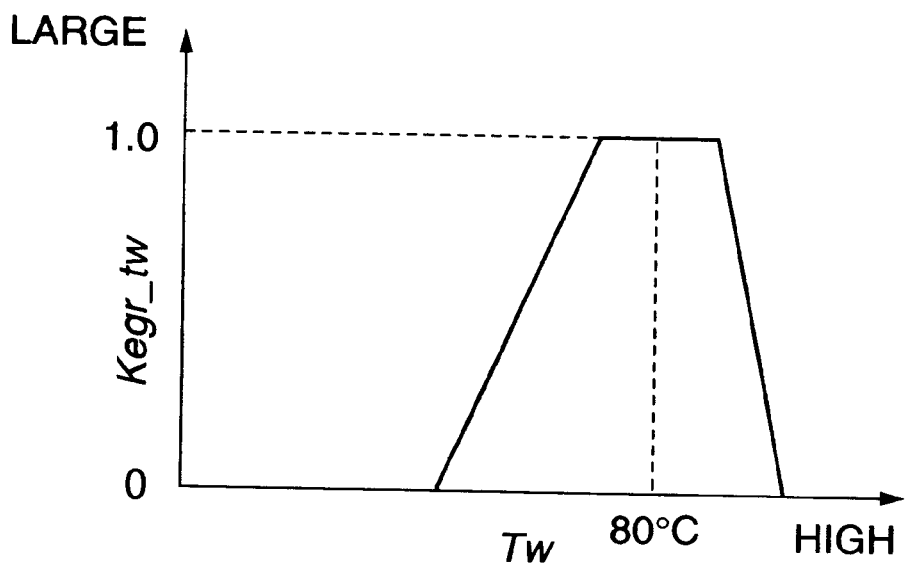
FIG. 13 is a diagram describing the contents of a water temperature correction coefficient map stored by the controller.

In a step S53, a water temperature correction coefficient Kegr_tw of the basic target EGR rate Megrb is calculated from the cooling water temperature Tw by looking up a map shown in FIG. 13. This map is stored beforehand in the memory of the controller 41. In a step S4, the target EGR rate Megr is calculated from the basic target EGR rate Megrb and water temperature correction factor Kegr_tw based on the following equation (4).

$$Megr = Megrb \cdot Kegr\_tw \quad (4)$$

Figure 14:
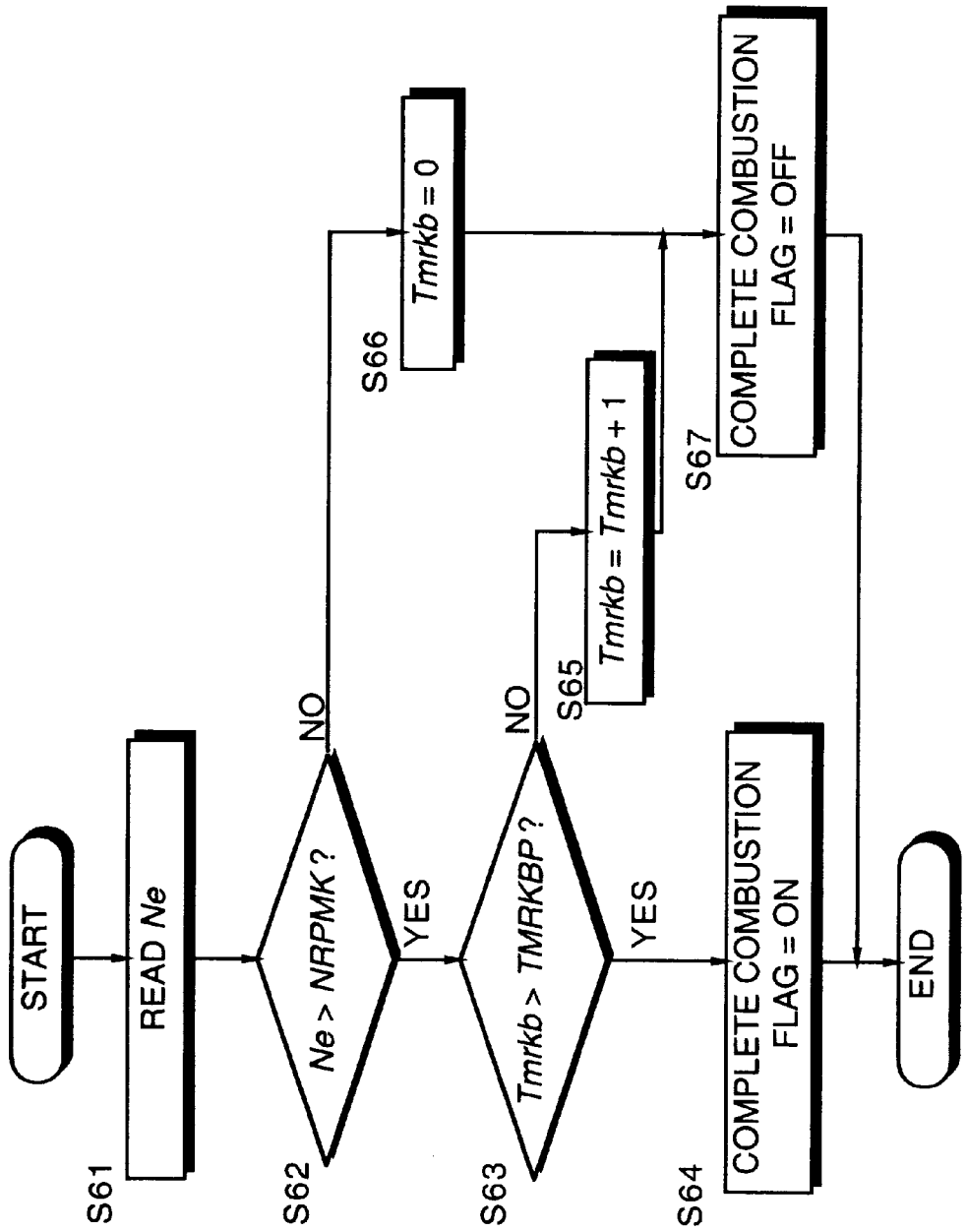
FIG. 14 is a flowchart describing a complete combustion determining routine performed by the controller.

In a step S55, the subroutine shown in FIG. 14 which determines whether the diesel engine 1 is in a complete combustion state is performed. This complete combustion determining subroutine will be described later.

In a step S56, the execution result of the subroutine is determined, for example, from the value of a complete combustion flag, and, in the case of the complete combustion state, the subroutine for calculating the target EGR rate Megr is terminated. When the state is not the complete combustion state, the target EGR rate Megr is corrected to 0 in a step S57, and the subroutine for calculating the target EGR rate Megr is terminated.

Therefore, exhaust gas recirculation is performed only after complete combustion of the diesel engine 1 is established so as to ensure stable startability of the diesel engine 1.

Now, the complete combustion determining subroutine of FIG. 14 will be described. This subroutine is performed every 10 milliseconds, for example.

In a step S61, the engine rotation speed Ne is read, and in a step S62, the engine rotation speed Ne is compared with a complete combustion determining slice level NRPMK which is equivalent to a complete combustion rotation speed.

The slice level NRPMK, for example, is set to 400 rpm. When the engine rotation speed Ne exceeds the slice level NRPMK, the routine proceeds to a step S63. Here, a counter value Tmrkb and a predetermined time TMRKBP are compared, and if the counter value Tmrkb is larger than the predetermined time, a complete combustion flag is turned ON in a step S64, and the subroutine is terminated.

If the engine speed Ne is equal to or less than the slice level NRPMK in the step S62, the subroutine proceeds to a step S66. Here, the counter value Tmrkb is cleared to 0, the complete combustion flag is turned to OFF in the following step S67, and the subroutine is terminated.

Also, if the counter value Tmrkb is equal to or less than the predetermined time TMRKBP, the counter value Tmrkb is incremented in a step S65, the complete combustion flag is turned OFF in a step S67, and the subroutine is terminated.

Due to this subroutine, even if the engine speed Ne exceeds the slice level NRPMK, the complete combustion flag is not turned ON immediately. The complete combustion flag changes to ON only after this state continues for the predetermined time TMRKBP.

Now, referring again to FIG. 7, after calculating the cylinder intake air volume Qacn and target EGR rate Megr as mentioned above in the steps S21 and S22, the subroutine for calculating the target EGR flowrate Tqek calculates a required EGR flowrate Mqec by the following equation (5) in a step S23.

$$Mqec = Qacn \cdot Megr \quad (5)$$

In a step S24, weighted average processing is applied by the following equation (6) to the required EGR flowrate Mqec, and a weighted average value Rqec is calculated.

$$Rqec = Mqec \cdot KIN \cdot KVOL + Rqec_{n-1} \cdot (1 - KIN \cdot KVOL) \quad (6)$$

where,

KIN=value corresponding to volumetric efficiency,
VE=total exhaust volume of the diesel engine 1, $$KVOL = \frac{VE}{NC \cdot VM},$$

NC=number of cylinders of the diesel engine 1,
VM=intake air system capacity of the diesel engine 1, and
$Rqec_{n-1}$=weighted average value calculated on the immediately preceding occasion when the subroutine was performed.

In the above equation (6), KIN·KVOL is equivalent to a weighted average coefficient.

In a step S25, the target EGR amount Tqec per cylinder is calculated by applying an advance correction by the following equation (7) using the intermediate processing value Rqec and required EGR amount Mqec.

$$Tqec = Mqec \cdot GKQEC + Rqec_{n-1} \cdot (1 - GKQEC) \quad (7)$$

where, GKQEC=advance correction gain.

The steps S24 and S25 are steps which perform advance processing on the required EGR amount Mqec taking account of the time required for EGR gas to reach the intake valve from the EGR valve 6 via the collector 3A of the diesel engine 1 and an intake manifold.

In the following step S26, a target EGR flowrate Tqek is calculated by the following equation (8), and the subroutine is terminated.

$$Tqek = Tqec \cdot \frac{Ne}{KCON} \quad (8)$$

where, $KCON$ = constant.

Equation (8) is an equation which converts the target EGR amount Tqec per cylinder into the target EGR amount Tqek per unit time, i.e., flowrate.

The above process for calculating the target EGR amount Tqek is a process that is known from the above-mentioned Tokkai Hei 10-325350.

Figure 15:
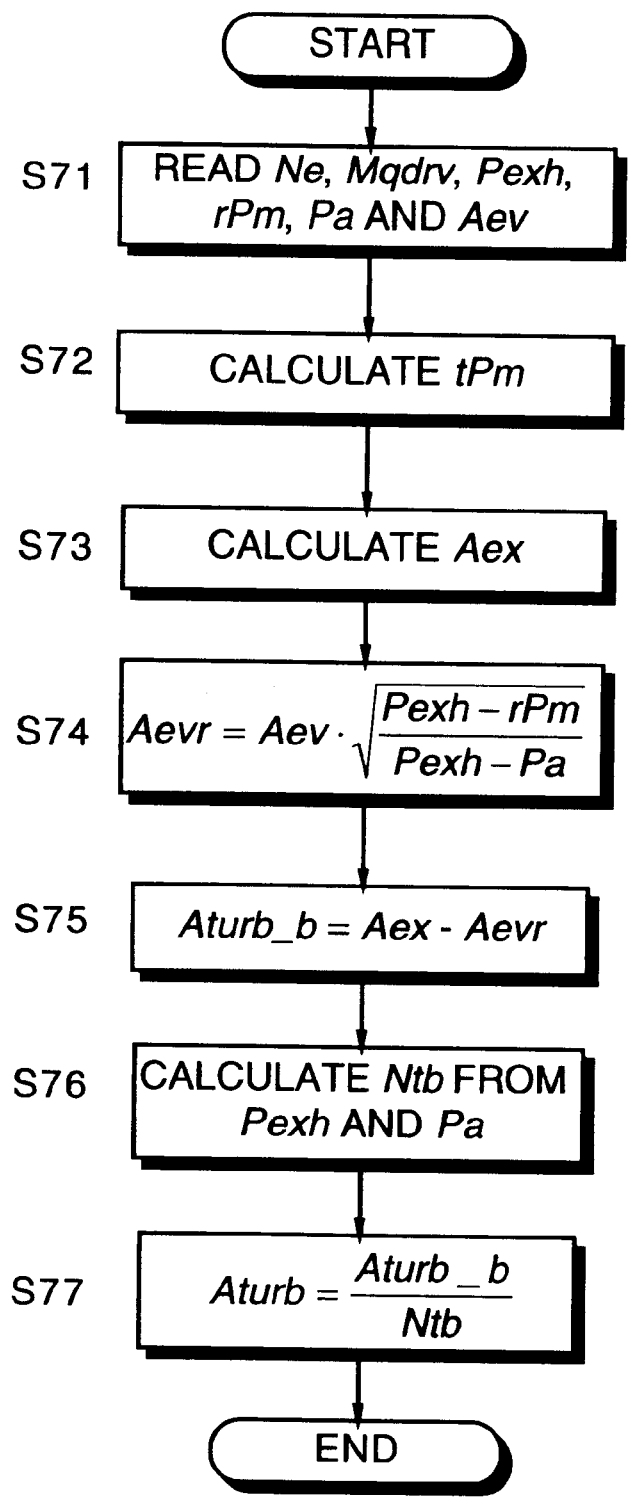
FIG. 15 is a flowchart describing a routine for calculating a nozzle opening performed by the controller.

Now, the controller 41 calculates the nozzle opening Aturb of the turbine nozzle 53 of the turbocharger 50 by the routine shown in FIG. 15. This routine is performed every 10 milliseconds, for example.

In a step S71, the engine rotation speed Ne, basic fuel injection amount Mqdrv, exhaust pressure Pexh, intake pressure rPm, atmospheric pressure Pa and target EGR valve opening surface area Aev are read. The intake pressure rPm is equal to the actual turbocharging pressure of the turbocharger 50.

Figure 16:
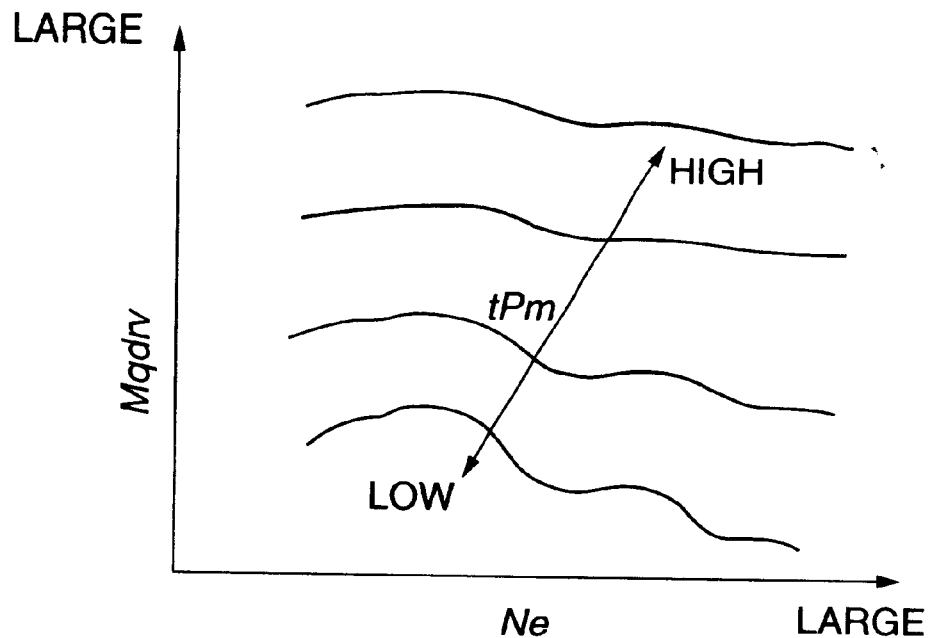
FIG. 16 is a diagram describing the contents of a target turbocharging pressure map stored by the controller.

In a step S72, the target turbocharging pressure tPm is calculated by looking up a target turbocharging pressure map shown in FIG. 16 from the engine rotation speed Ne and basic fuel injection amount Mqdrv. This map is stored beforehand in the memory of the controller 41. As seen from this map, the target turbocharging pressure tPm is set higher the larger the basic fuel injection amount Mqdrv, i.e., engine load.

Figure 17:
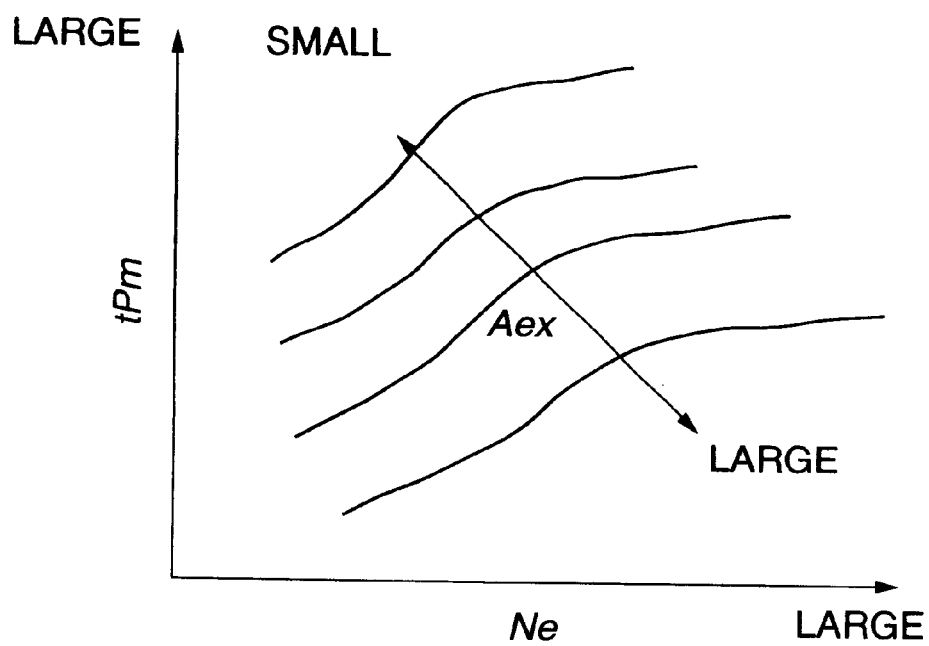
FIG. 17 is a diagram describing the contents of an exhaust system total opening surface area map stored by the controller.

Next, in a step S73, an exhaust system total opening surface area Aex is calculated from the target turbocharging pressure tPm and engine rotation speed Ne by referring to the map shown in FIG. 17. This map is also stored beforehand in the memory of the controller 41.

In the map of FIG. 17, under conditions where the engine rotation speed Ne is fixed, the exhaust system total opening surface area Aex is set to be smaller the higher the target turbocharging pressure tPm. The reason why the value of the exhaust system total opening surface area Aex is set large in the low engine load region where the target turbocharging pressure tPm is low, even for identical engine rotation speeds Ne, is because it is desired to increase the EGR amount in the low load region. Conversely, the reason why the value of the exhaust system total opening surface area Aex is set small in the high engine load region where the target turbocharging pressure tPm is high, is because the nozzle opening of the variable nozzle 53 must be made small in order to obtain a high turbocharging pressure in the high load region.

In the map of FIG. 17, the vertical axis is a parameter representing the engine load, so the target fuel injection amount Qsol or engine torque may be used instead of the target turbocharging pressure tPm.

In a step S74, an EGR valve opening surface area equivalent value Aevr is calculated by the following equation (9) using the target EGR valve opening surface area Aev, exhaust pressure Pexh, intake pressure rPm and atmospheric pressure Pa.

$$Aevr = Aev \cdot \sqrt{\frac{Pexh - rPm}{Pexh - Pa}} \quad (9)$$

Equation (9) is an equation which converts the target EGR valve opening surface area Aev to an opening surface area equivalent to a turbine nozzle opening surface area equivalent value Aturb_b by applying the required transformation to the target EGR valve opening surface area Aev in order to treat it as a parameter of identical dimensions to the turbine nozzle opening surface area equivalent value Aturb_b described later.

Specifically, equation (9) is derived as follows.

Whereas a differential pressure (Pexh−Pa) upstream/downstream of the exhaust gas turbine 52 is based on the atmospheric pressure Pa, the intake pressure rPm on which the differential pressure (Pexh−rPm) upstream/downstream of the EGR valve 5 is based, is equal to the turbocharging pressure. Thus, since the pressure on which each is based is different, the flowrates through the EGR valve 6 and turbine nozzle 53 are different for the same exhaust pressure Pexh, and the EGR valve opening surface area and nozzle opening surface area cannot be treated by identical dimensions.

Here, the flowrate Qegr through the EGR valve 6 may be expressed by the following equation (10) by Bernoulli's theorem.

$$Qegr = Aev \cdot \sqrt{Pexh - rPm} \quad (10)$$

Assuming that a flowrate equal to the flowrate Qegr flows through the turbine nozzle 53, if the value of the turbine nozzle opening surface area is Aevr, the flowrate Q through the turbine nozzel 53 may be expressed by the following equation (11).

$$Q = Aevr \cdot \sqrt{Pexh - Pa} \quad (11)$$

Thus, if the flowrate Qegr of equation (10) and the flowrate Q of equation (11) are equal, even if the reference pressures are different, equation (9) is obtained by solving these simultaneous equations for Aevr.

After calculating the EGR valve opening surface area equivalent value Aevr in the step S74 in this way, in a step S75, the EGR valve opening surface area equivalent value Aevr is deducted from the exhaust system total opening surface area Aex to give the nozzle opening surface area equivalent value Aturb_b. Here, the nozzle opening surface area equivalent value Aturb_b must be a positive value.

Figure 18:
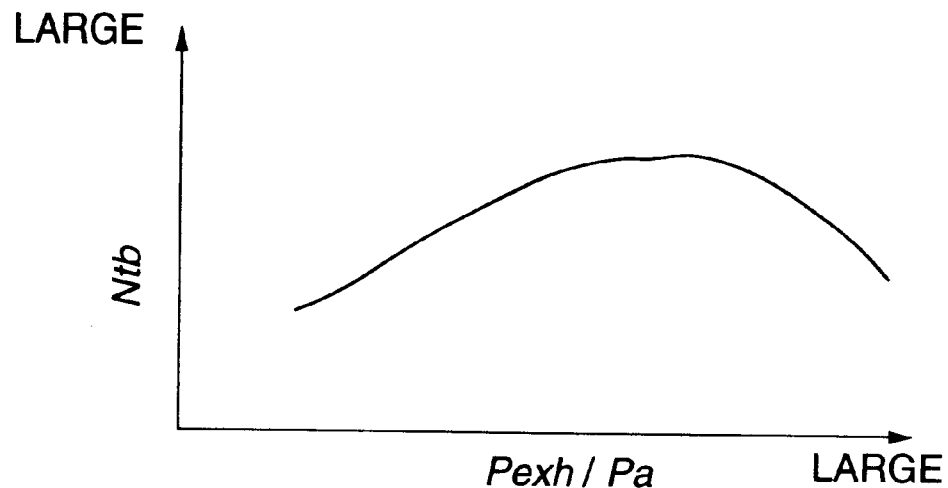
FIG. 18 is a diagram describing the contents of an adaptation coefficient map stored by the controller.

In the following step S76, the adaptation coefficient Ntb which includes the turbine efficiency is found by looking up a map shown in FIG. 18 from the ratio of the exhaust gas pressure Pexh and the atmospheric pressure Pa. This map is stored beforehand in the memory of the controller 41.

In a following step S77, the target nozzle opening surface area Aturb is calculated by dividing the nozzle opening surface area equivalent value Aturb_b by the adaptation coefficient Ntb.

Theoretically, although the target nozzle opening surface area Aturb may be set equal to the nozzle opening surface area equivalent value Aturb_b, when actually performing control using the EGR valve 6 and turbocharger 50, the target nozzle opening surface area Aturb is intentionally set as mentioned above to correct for the discrepancy between theory and practice by the adaptation coefficient Ntb.

Figure 19:
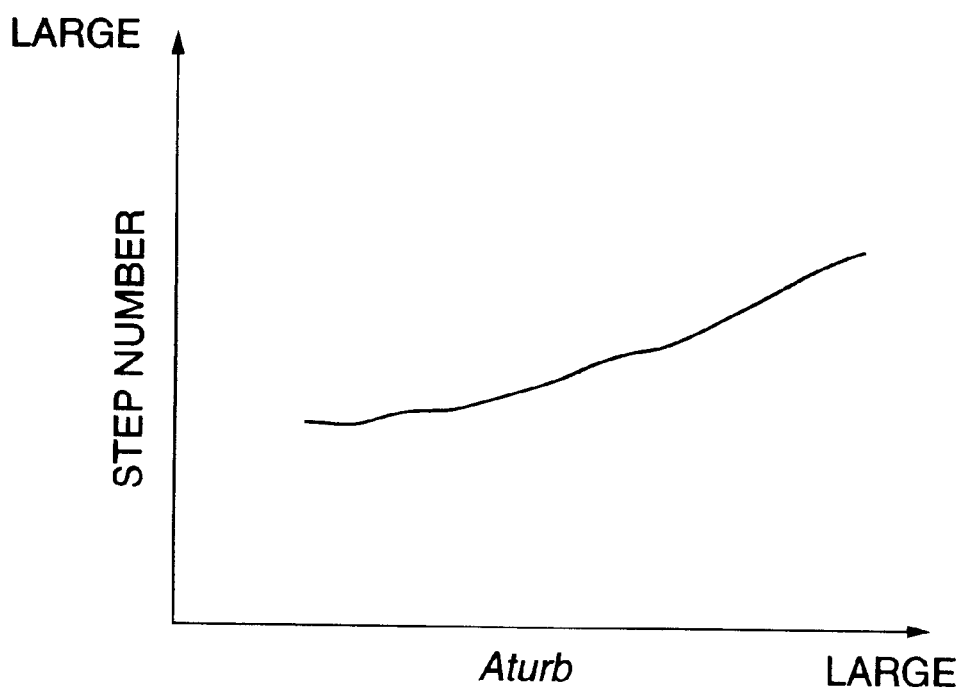
FIG. 19 is a diagram describing the contents of a nozzle actuator drive signal map stored by the controller.

The target nozzle opening surface area Aturb obtained is converted into the step number of the step motor 54 by referring to a map shown in FIG. 19. This map is also stored beforehand in the memory of the controller 41. The controller 41 outputs this step number to the step motor 54 to obtain the target nozzle opening surface area Aturb. In this embodiment, as the turbine nozzel 53 of the variable capacity turbocharger 50 and EGR valve 6 are controlled by parameters of the same dimensions as the opening surface area, it is possible to control the turbocharging pressure and EGR flowrate independently. That is, even if the turbocharging pressure changes, it is possible to maintain the EGR rate at a constant value.

Therefore, not only is optimum control of the turbocharging pressure and EGR flowrate achieved in the steady state, but high precision is also obtained in controlling the turbocharging pressure and EGR flowrate in the transient state of the engine 1. Highly precise control of turbocharging pressure and EGR flowrate contributes to reduction of noxious components in the exhaust gas, and ensures good drivability of a vehicle.

This invention has an especially desirable effect when applied to engines requiring a large EGR, or engines where the a large variation of turbocharging pressure is required.

Moreover, a particularly desirable effect is obtained in engines where the amount of noxious components in the exhaust gas reacts sensitively to fluctuation of EGR amount and turbocharging pressure.

Next, a second embodiment of this invention will be described referring to FIG. 20.

Figure 20:
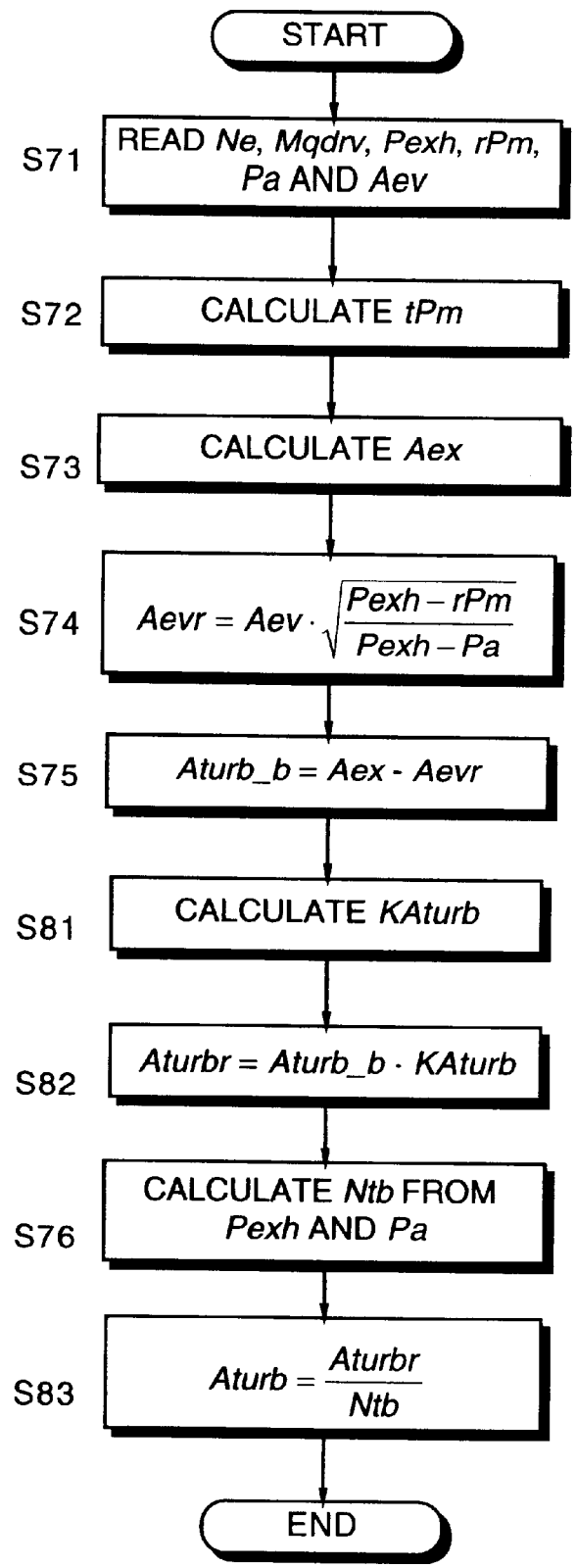
FIG. 20 is similar to FIG. 15, but showing a second embodiment of this invention.

The flowchart shown in FIG. 20 replaces the flowchart of FIG. 15 of the first embodiment. Steps which perform the same processing as that of FIG. 15 are assigned the same step number.

In this embodiment, the nozzle opening surface area equivalent value Aturb_b is feedback corrected so that the real turbocharging pressure rPm coincides with the target turbocharging pressure tPm. That is, as in the first embodiment, after calculating the nozzle opening surface area equivalent value Aturb_b by the step S75, a subroutine calculates the feedback correction coefficient KAturb so that the real turbocharging pressure rPm coincides with the target turbocharging pressure tPm in a step S81.

In the following step S82, the nozzle opening surface area equivalent value Aturb_b is multiplied by a correction factor KAturb to calculate a nozzle effective opening surface area Aturbr.

In the following steps S76, the adaptation coefficient Ntb is calculated as in the aforesaid first embodiment, and in a step S83, the nozzle effective opening surface area Aturbr is divided by the adaptation coefficient Ntb to calculate the target nozzle opening surface area Aturb.

Thus, in the second embodiment, as the nozzle opening surface area equivalent value Aturb_b is feedback corrected so that the real turbocharging pressure rPm coincides with the target turbocharging pressure tPm, scatter in the control of the turbocharger 50, i.e., product-specific variations and temporal degradation, are eliminated. Moreover, as the nozzle opening surface area equivalent value Aturb_b is feedback corrected, even if the specification of the step motor 54 which drives the turbine nozzel 53 is altered or the step motor 54 is replaced by a different type of actuator, correspondence is easily obtained.

Furthermore, decrease of control precision resulting from the nonlinear characteristic which the actuator generally has, can be suppressed.

Next, a third embodiment of this invention will be described referring to FIGS. 21–24. The flowchart of FIG. 21 replaces the flowchart of FIG. 20 of the second embodiment. Identical numbers are assigned to steps which perform the same processing as that of FIG. 20.

Figure 24:
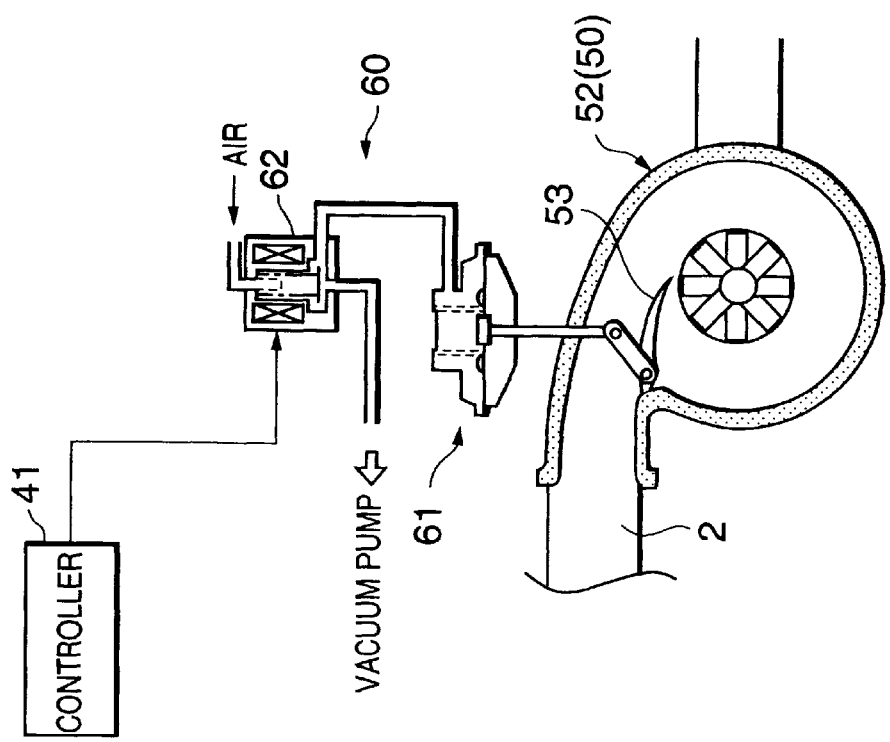
FIG. 24 is a schematic diagram of a nozzle actuator according to the third embodiment.

Although the turbine nozzel 53 of the turbocharger 50 was driven by the step motor 54 in the aforesaid first and second embodiments, in this embodiment, the step motor 54 is replaced by a negative pressure actuator 60 which drives the turbine nozzel 53 as shown in FIG. 24.

The negative pressure actuator 60 comprises a diaphragm actuator 61 which responds to negative pressure, and an electromagnetic negative pressure control value 62 which adjusts the negative pressure supplied to the actuator 61 according to a duty signal from the controller 41. The controller 41 outputs a duty signal to the negative pressure control value 62 so that the target nozzle opening surface area Aturb obtained by a calculation routine described hereafter, may be realized.

When the turbine nozzel 53 is driven by the negative pressure actuator 60, the response characteristic of the diaphragm actuator 61 relative to the duty signal given to the negative pressure control value 62 largely depends on temperature.

For the same target turbocharging pressure tPm and engine rotation speed Ne, when the turbine nozzel 53 is driven so that the negative pressure actuator 60 gives the nozzle opening surface area equivalent value Aturb_b at high temperature, the negative pressure actuator 60 renders good response. At low temperature, however, the response of the negative pressure actuator 60 falls off, and the opening of the turbine nozzel 53 does not reach the nozzle opening which corresponds to the nozzle opening surface area equivalent value Aturb_b. In this case, the target turbocharging pressure tPm is of course not realized.

In this embodiment, the controller 41 performs learning of an exhaust system total opening surface area Aex so that temperature changes which affect operation of the negative pressure actuator 60 are compensated, and the target turbocharging pressure tPm is attained regardless of temperature.

The temperature which affects the operation of the negative pressure actuator 60 varies depending on the target turbocharging pressure tPm and engine rotation speed Ne.

Therefore, the learning values comprise a map which has the target turbocharging pressure tPm and engine rotation speed Ne as parameters.

Figure 21:
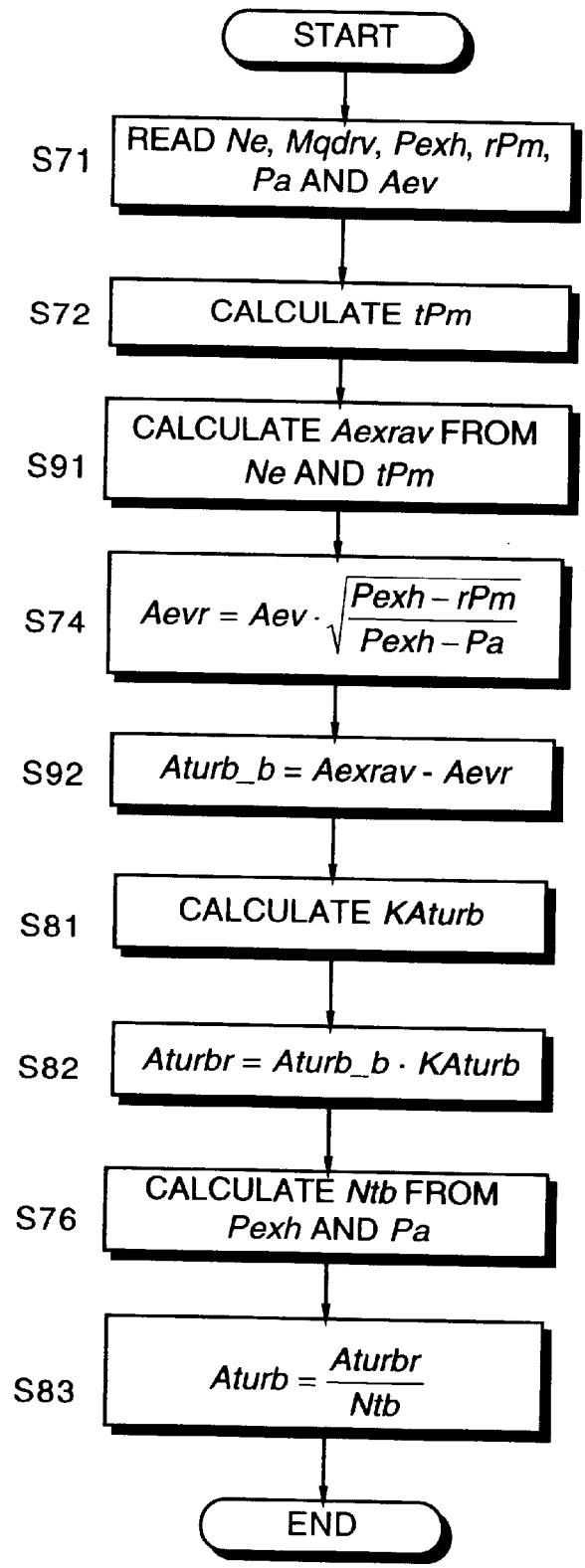
FIG. 21 is similar to FIG. 15, but showing a third embodiment of this invention.

Now, in the routine for calculating the target nozzle opening Aturb of the turbine nozzel 53 shown in FIG. 21, steps S91, S92 are provided instead of the steps S73, S75 of the same routine by the second embodiment.

Figure 22:
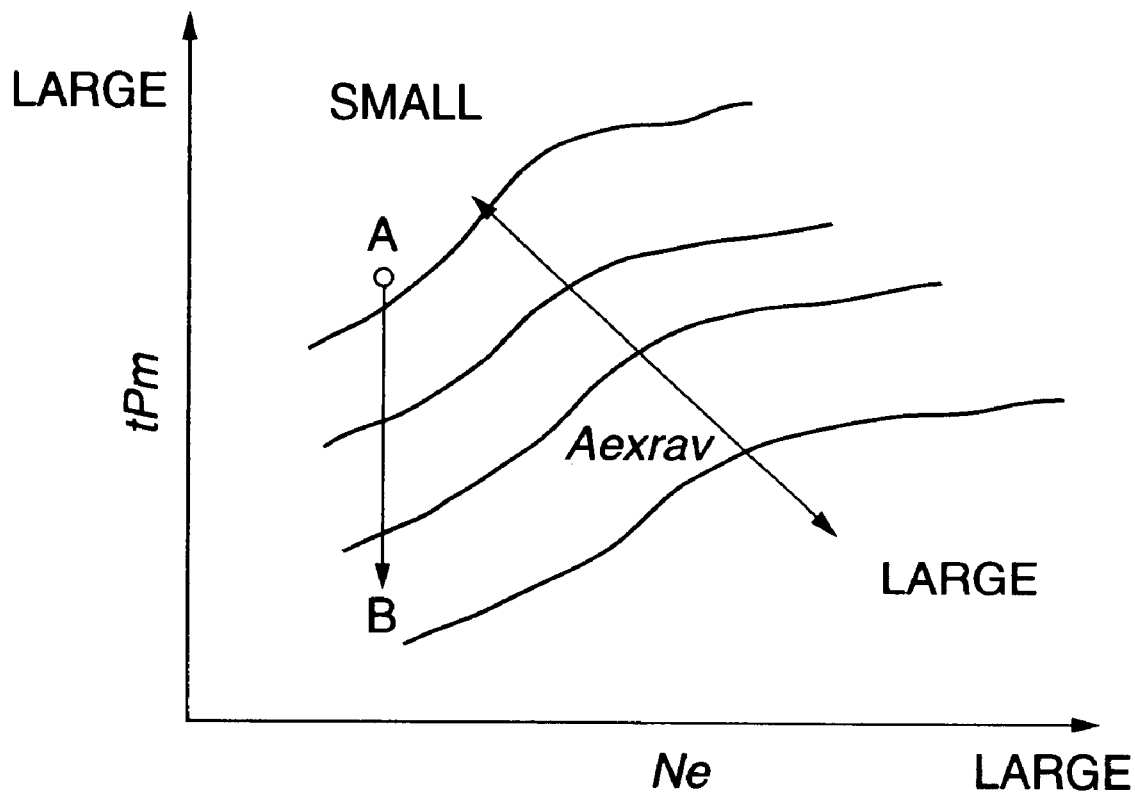
FIG. 22 is a diagram describing the contents of a learning value map stored by the controller according to the third embodiment.

In the step S91, a learning value Aexrav of the exhaust gas system total opening surface area is calculated from the engine rotation speed Ne and target turbocharging pressure tPm by referring to a map of learning values shown in FIG. 22. Although this map has the same content as the map of FIG. 17 of the aforesaid first embodiment in its initial state, it is set to match low water temperature characteristics.

This map is previously set in a backup RAM 41A or EEPROM (electrically erasable programmable read-only memory) with which the controller 41 is provided, and its contents are updated by learning.

It is also possible to use the map of FIG. 17 as it is as a map of the initial state, or to set the initial value of the learning value Aexrav to 0 instead of assigning initial values to the map.

After calculating the EGR valve opening surface area equivalent value Aevr as in the aforesaid first embodiment in the step S74, the difference of the learning value Aexrav and EGR valve opening surface area equivalent value Aevr is calculated as the nozzle opening surface area equivalent value Aturb_b in the step S92.

Subsequently, the target nozzle opening surface area Aturb is calculated according to the same process as that of the second embodiment.

Figure 23:
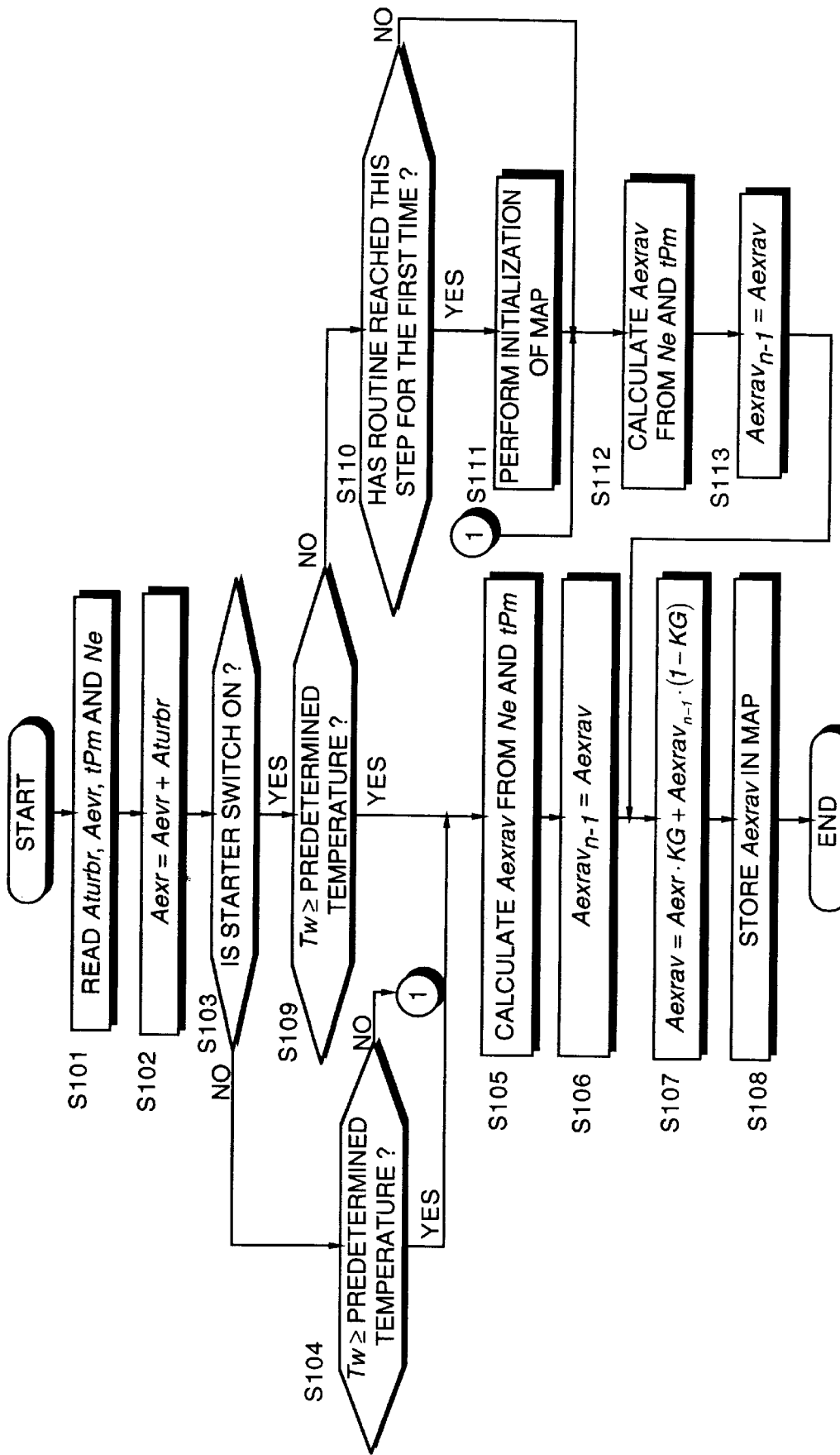
FIG. 23 is a flowchart describing a routine for calculating a learning value performed by the controller according to the third embodiment.

Next, the routine for updating the learning value Aexrav will be described referring to the flowchart of FIG. 23.

This routine is performed at an interval of, for example, 10 milliseconds.

In a step S101, the nozzle effective opening surface area Aturbr, EGR valve opening surface area equivalent value Aevr, target turbocharging pressure tPm and engine rotation speed Ne are read.

In a step S102, the total opening surface area Aexr of the exhaust system is calculated by adding the EGR valve opening surface area equivalent value Aevr to the nozzle effective opening surface area Aturbr.

In a step S103, it is determined whether or not the starter switch of the diesel engine 1 is ON, i.e., whether the diesel engine 1 is starting or not. If the starter switch is OFF, the routine proceeds to a step S104, and it is determined whether or not the engine cooling water temperature Tw has risen to a predetermined temperature. When the starter switch is OFF and the cooling water temperature Tw has reached the predetermined temperature, it is considered that warm-up of the diesel engine 1 is complete. In this case, the routine proceeds to a step S105.

On the other hand, if the starter switch is ON in the step S103, it is determined whether or not the engine cooling water temperature Tw rose to the predetermined temperature in a step S109. When the cooling water temperature Tw has reached the predetermined temperature, it is considered that the diesel engine 1 is in a hot restart state. In this case also, the routine proceeds to the step S105.

On the other hand, when the engine cooling water temperature Tw is lower than the predetermined temperature in the step S109, it is considered that the diesel engine 1 is in a cold start state. In this case, the routine proceeds to a step S110.

In the step S110, it is determined whether or not the routine has reached this step for the first time after the start of the diesel engine 1. If this is the first time, the map of learning values is initialized in a step S111. This initialization is performed by applying the map shown in FIG. 17 for example, or by setting initial values to zero.

After performing the step S111, the subroutine proceeds to a step S112. If it is determined in the step S110 that this is not the first time the routine has reached the step S110, the subroutine skips the step S111 and proceeds to the step S112.

When the engine cooling water temperature Tw is lower than the predetermined temperature in the step S104, the subroutine proceeds to the same step S112. This means that when the cooling water temperature Tw is lower than the predetermined temperature, the step S112 is performed regardless of whether or not the diesel engine 1 is starting, i.e., regardless of whether or not startup is complete.

The processing of the steps S109–S111 ensures that, when the diesel engine 1 is performing a cold start, initialization of the map of learning values is performed on the first occasion the subroutine is executed immediately after startup.

In the step S112, the learning value Aexrav of the exhaust system total opening surface area is calculated from the engine rotation speed Ne and target turbocharging pressure tPm by referring to the map of learning values.

In the following step S113, the calculated learning value Aexrav is entered into an old learning value Aexrav$_{n-1}$. The subroutine then proceeds to the step S107.

The learning value is calculated by the following equation (12) in the step S107.

$$Aexrav = Aexr \cdot KG + Aexrav_{n-1} \cdot (1-KG) \quad (12)$$

where,

Aexrav=new learning value,

Aexr=actual total opening surface area of exhaust system,

Aexrav$_{n-1}$=old learning value, and

KG=learning updating proportion ($0 \leq KG \leq 1$).

The learning value Aexrav of the exhaust system total opening surface area is stored in a position corresponding to the learning value map in a last step S108.

On the other hand, when it is determined that the cooling water temperature Tw is higher than the predetermined temperature in the steps S104 or S109, the learning value Aexrav of the exhaust system total opening surface area is calculated from the engine rotation speed Ne and target turbocharging pressure tPm by referring to the map of learning values in the step S105, as in the case of the step S112. In the following step S106, after entering the learning value Aexrav calculated as in the step S113 into the old learning value Aexrav$_{n-1}$, the processing of the steps S107 and S108 is performed.

The processing of the steps S105 and S106 is the same as the processing of the steps S112 and S113, but the map used in the step S112 is a map which stores learning values learned at low water temperature, whereas the map used in the step S105 is a map which stores learning values learned at high water temperature.

Although the same maps are used, the learning values stored in the maps at low water temperature and high water temperature are different and may effectively be considered as separate maps, therefore the steps S105, S106 are provided independently of the steps S112, S113 in the flowchart.

According to this embodiment, the map which calculates the exhaust system total opening surface area by the above subroutine is updated by learning.

Next, a description will be given of how the target turbocharging pressure differs at a point A in the high temperature state and a point B in the low-temperature state shown in FIG. 22. For the sake of convenience, the target EGR rate and target turbocharging pressure will be assumed constant.

Even when learning of the exhaust system total opening surface area is not proceeding, the response of the negative pressure actuator 60 at the high temperature point A is high, and if the nozzle opening is controlled so that the nozzle opening surface area equivalent value Aturb_b is obtained, the real turbocharging pressure coincides with the target turbocharging pressure.

On the other hand, at the point B, the temperature is low and the negative pressure actuator 60 does not respond quickly.

In this case, if learning is not proceeding, the actual nozzle opening becomes smaller than the nozzle opening which corresponds to the nozzle opening surface area equivalent value Aturb_b at high temperature, and the real turbocharging pressure rPm may be higher than the target turbocharging pressure tPm.

(1) In that case, first, a feedback correction coefficient KAturb is calculated so that the real turbocharging pressure rPm approaches the target turbocharging pressure tPm.

Consequently, the nozzle effective opening surface area Aturbr (=Aturb_b·KAturb) increases, and the total opening surface area Aexr (=Aturbr+Aevr) is also increased. The learning value Aexrav calculated based on the total opening surface area Aexr is also updated to a larger value.

(2) After updating the learning value Aexrav, the nozzle opening surface area equivalent value Aturb_b (=Aexrav−Aevr) increases to a larger value than before updating, and the real turbocharging pressure controlled using the learning value becomes less than its value before updating.

(3) By repeating the process of (1) and (2), the learning value Aexrav eventually converges to a constant value. In the state where the learning value has converged, as the real turbocharging pressure coincides with the target turbocharging pressure, the feedback correction coefficient KAturb is 1.0, and the nozzle opening surface area equivalent value Aturb_b no longer increases. Hence, when driving the variable nozzle by the negative pressure actuator, the target turbocharging pressure is obtained also at the low temperature point B.

Similarly, the exact target turbocharging pressure is realized as learning proceeds also at other points of FIG. 22.

In this embodiment, therefore, even when the turbine nozzle 53 is driven by the negative pressure actuator 60 whose characteristic varies with temperature, the target turbocharging pressure can be attained with sufficient accuracy regardless of temperature. As the engine rotation speed Ne and target turbocharging pressure tPm are assigned as parameters to determine the learning value Aexrav, the variation of these values is reflected in the control of the turbocharging pressure via the learning value Aexrav. The precision of the turbocharging pressure control is therefore maintained constant regardless of the variation of these values.

As the map of the learning value Aexrav stored beforehand in theÅ@backup RAM is used during hot restart without initializing, the target turbocharging pressure can be reached immediately after a hot restart.

Further, during a cold start, learning values are initialized to the pattern set for low water temperature, so a duty signal adapted to low temperature characteristics of the negative pressure actuator 60 is output to the negative pressure control value 62, and the target turbocharging pressure can soon be attained.

The contents of Tokugan Hei 11-44754, with a filing date of Feb. 23, 1999 in Japan, are hereby incorporated by reference.

Although the invention has been described above by reference to certain embodiments of the invention, the invention is not limited to the embodiments described above. Modifications and variations of the embodiments described above will occur to those skilled in the art, in light of the above teachings.

For example, in the above embodiments, this invention was applied to a diesel engine performing so-called low temperature premix combustion wherein the heat generation pattern is single stage, but it may of course be applied also to an ordinary diesel engine having double combustion stages which performs diffuse combustion after the premix combustion.

Figure 25:
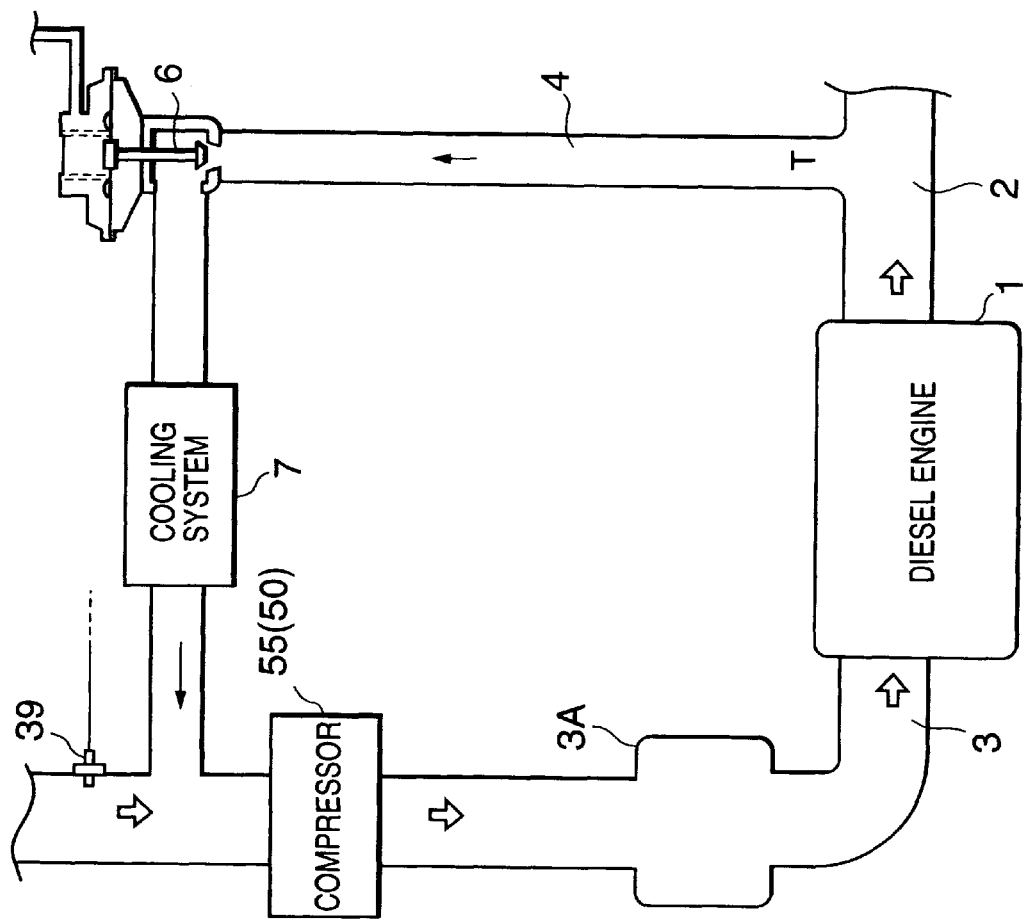
FIG. 25 is a schematic diagram of an EGR passage according to a fourth embodiment of this invention.

Moreover, in the above embodiments, the EGR passage 4 was connected to the collector 3A of the intake air passage 3, but this invention may be applied also to a diesel engine wherein the EGR passage 4 is connected to a position upstream of the compressor 55 of the intake passage 3 and downstream of the air flow meter 39 as shown in FIG. 25.

The embodiments of this invention in which an exclusive property or privilege is claimed are define as follows:

What is claimed is:

1. A control device for controlling an opening of an exhaust recirculation valve which is provided in an exhaust gas recirculation passage of an diesel engine and an opening of a turbine nozzle which is provided in a turbine of a turbocharger of the diesel engine, the diesel engine being provided with an intake passage and an exhaust passage, the exhaust gas recirculation passage connecting the intake passage and the exhaust passage, the turbine being disposed in the exhaust passage and driving a compressor disposed in the intake passage, the control device comprising:

a sensor which detects an engine rotation speed; and
a microprocessor programmed to:
calculate a target exhaust gas recirculation flowrate based on a target exhaust gas recirculation rate;
calculate a target exhaust gas recirculation valve opening surface area based on the target exhaust gas recirculation flowrate;
control the opening of the exhaust gas recirculation valve to the target exhaust gas recirculation valve opening surface area;
calculate a target turbocharging pressure;
calculate an exhaust system total opening surface area from the target turbocharging pressure and the engine rotation speed;
calculate an opening surface area of the turbine nozzle when the same flowrate of exhaust gas as the target exhaust gas recirculation flowrate flows through the turbine, as an exhaust gas recirculation valve opening surface area equivalent value;
calculate a nozzle opening surface area equivalent value by deducting the exhaust gas recirculation valve opening surface area equivalent value from the exhaust system total opening surface area;
calculate a target nozzle opening surface area based on the nozzle opening surface area equivalent value; and
control the opening of the turbine nozzle to the target nozzle opening surface area.

2. A control device as defined in claim 1, wherein the exhaust gas recirculation valve opening surface area equivalent value is calculated by the following equation:

$$Aevr = Aev \cdot \sqrt{\frac{Pexh - rPm}{Pexh - Pa}}$$

where, $Aevr$ = exhaust gas recirculation valve opening surface area equivalent value,
$Aev$ = target exhaust gas recirculation valve opening surface area
$Pexh$ = exhaust gas pressure,
$rPm$ = real turbocharging pressure, and
$Pa$ = atmospheric pressure.

3. A control device as defined in claim 1, wherein the control device further comprises a sensor which detects a real turbocharging pressure, and the microprocessor is further programmed to calculate a feedback correction amount of the target nozzle opening surface area so that the real turbocharging pressure coincides with the target turbocharging pressure, and correct the target nozzle opening surface area by the feedback correction amount.

4. A control device as defined in claim 1, wherein the microprocessor is provided with a map of the exhaust system total opening surface area which has the target turbocharging pressure and engine rotation speed as parameters, and the microprocessor is further programmed to calculate the exhaust system total opening surface area by referring to the map.

5. A control device as defined in claim 4, wherein the control device further comprises a sensor which detects the real turbocharging pressure, and the microprocessor is further programmed to calculate the feedback correction amount of the target nozzle opening surface area so that the real turbocharging pressure coincides with the target turbocharging pressure, correct the target nozzle opening surface area by the feedback correction amount, calculate a real exhaust system total opening surface area by adding the target nozzle opening surface area after correction to the exhaust recirculation valve opening surface area equivalent value, and update values of the exhaust system total opening surface area of the map based on the real exhaust gas system total opening surface area.

6. A control device as defined in claim 5, wherein the control device further comprises a sensor which detects a cooling water temperature of the diesel engine, and a starter switch which detects startup of the diesel engine, and the microprocessor is further programmed to perform initialization of the map when the cooling water temperature is less than a predetermined value on startup of the diesel engine.

7. A control device as defined in claim 6, wherein the microprocessor is provided with a memory which stores the contents of the map even after the diesel engine has stopped, and the microprocessor is further programmed to calculate the exhaust system total opening surface area using a map value stored in the memory when the cooling water temperature is less than the predetermined value on startup of the diesel engine.

8. A control device as defined in claim 1, wherein the control device further comprises a sensor which detects a pressure of the exhaust passage upstream of the turbine and a sensor which detects an atmospheric pressure, and the microprocessor is further programmed to calculate an adaptation coefficient comprising turbine efficiency based on the ratio of the pressure of the exhaust passage and the atmospheric pressure, and calculate the target nozzle opening surface area by correcting the nozzle opening surface area equivalent value by the adaptation coefficient.

9. A controller as defined in claim 1, wherein the exhaust gas recirculation passage is connected to the intake passage upstream of the compressor.

10. A control device for controlling an opening of an exhaust recirculation valve which is provided in an exhaust gas recirculation passage of an diesel engine and an opening of a turbine nozzle which is provided in a turbine of a turbocharger of the diesel engine, the diesel engine being provided with an intake passage and an exhaust passage, the exhaust gas recirculation passage connecting the intake passage and the exhaust passage, the turbine being disposed in the exhaust passage and driving a compressor disposed in the intake passage, the control device comprising:

means for detecting an engine rotation speed;

means for calculating a target exhaust gas recirculation flowrate based on a target exhaust gas recirculation rate;

means for calculating a target exhaust gas recirculation valve opening surface area based on the target exhaust gas recirculation flowrate;

means for controlling the opening of the exhaust gas recirculation valve to the target exhaust gas recirculation valve opening surface area;

means for calculating a target turbocharging pressure;

means for calculating an exhaust system total opening surface area from the target turbocharging pressure and the engine rotation speed;

means for calculating an opening surface area of the turbine nozzle when the same flowrate of exhaust gas as the target exhaust gas recirculation flowrate flows through the turbine, as an exhaust gas recirculation valve opening surface area equivalent value;

means for calculating a nozzle opening surface area equivalent value by deducting the exhaust gas recirculation valve opening surface area equivalent value from the exhaust system total opening surface area;

means for calculating a target nozzle opening surface area based on the nozzle opening surface area equivalent value; and means for controlling the opening of the turbine nozzle to the target nozzle opening surface area.

11. A control method for controlling an opening of an exhaust recirculation valve which is provided in an exhaust gas recirculation passage of an diesel engine and an opening of a turbine nozzle which is provided in a turbine of a turbocharger of the diesel engine, the diesel engine being provided with an intake passage and an exhaust passage, the exhaust gas recirculation passage connecting the intake passage and the exhaust passage, the turbine being disposed in the exhaust passage and driving a compressor disposed in the intake passage, the control method comprising:

detecting an engine rotation speed;

calculating a target exhaust gas recirculation flowrate based on a target exhaust gas recirculation rate;

calculating a target exhaust gas recirculation valve opening surface area based on the target exhaust gas recirculation flowrate;

controlling the opening of the exhaust gas recirculation valve to the target exhaust gas recirculation valve opening surface area;

calculating a target turbocharging pressure;

calculating an exhaust system total opening surface area from the target turbocharging pressure and the engine rotation speed;

calculating an opening surface area of the turbine nozzle when the same flowrate of exhaust gas as the target exhaust gas recirculation flowrate flows through the turbine, as an exhaust gas recirculation valve opening surface area equivalent value;

calculating a nozzle opening surface area equivalent value by deducting the exhaust gas recirculation valve opening surface area equivalent value from the exhaust system total opening surface area;

calculating a target nozzle opening surface area based on the nozzle opening surface area equivalent value; and controlling the opening of the turbine nozzle to the target nozzle opening surface area.

* * * * *